US009253507B2

(12) United States Patent
Alshin et al.

(10) Patent No.: US 9,253,507 B2
(45) Date of Patent: *Feb. 2, 2016

(54) METHOD AND DEVICE FOR INTERPOLATING IMAGES BY USING A SMOOTHING INTERPOLATION FILTER

(71) Applicant: SAMSUNG ELECTRONICS CO., LTD., Suwon-si (KR)

(72) Inventors: Alexander Alshin, Suwon-si (KR); Elena Alshina, Suwon-si (KR); Jianle Chen, Suwon-si (KR); Woo-jin Han, Suwon-si (KR); Nikolay Shlyakhov, Suwon-si (KR); Yoon-mi Hong, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/632,176

(22) Filed: Feb. 26, 2015

(65) Prior Publication Data

US 2015/0237359 A1    Aug. 20, 2015

Related U.S. Application Data

(63) Continuation of application No. 13/877,074, filed as application No. PCT/KR2011/007220 on Sep. 30, 2011.

(60) Provisional application No. 61/450,775, filed on Mar.

(Continued)

(51) Int. Cl.
*H04N 19/86* (2014.01)
*H04N 19/635* (2014.01)
(Continued)

(52) U.S. Cl.
CPC ............. *H04N 19/86* (2014.11); *H04N 19/117* (2014.11); *H04N 19/182* (2014.11);
(Continued)

(58) Field of Classification Search
CPC ....... H04N 19/80; H04N 18/82; H04N 19/82; H04N 19/86; H04N 19/117; H04N 19/523; H04N 19/625
See application file for complete search history.

(56) References Cited

U.S. PATENT DOCUMENTS 6,768,817 B1  7/2004  Cheng et al.
7,230,742 B1  6/2007  Kuwata et al.
(Continued)

FOREIGN PATENT DOCUMENTS

CN    1399766 A    2/2003
CN    101212672 A    7/2008
(Continued)

OTHER PUBLICATIONS

G. Sullivan, T. Wiegand, W.J. Han, B. Bross, & J.R. Ohm, "WD2: Working Draft 2 of High-Efficiency Video Coding", JCT-VC Document No. D503 (Apr. 15, 2011).*
(Continued)

*Primary Examiner* — Dave Czekaj
*Assistant Examiner* — David N Werner
(74) *Attorney, Agent, or Firm* — Sughrue Mion, PLLC

(57) ABSTRACT

Provided are a method of interpolating an image by determining interpolation filter coefficients, and an apparatus for performing the same. The method includes: differently selecting an interpolation filter, from among interpolation filters for generating at least one sub-pel-unit pixel value located between integer-pel-unit pixels, based on a sub-pel-unit interpolation location and a smoothness; and generating the at least one sub-pel-unit pixel value by interpolating, using the selected interpolation filter, pixel values of the integer-pel-unit pixels.

3 Claims, 27 Drawing Sheets

Related U.S. Application Data 9, 2011, provisional application No. 61/431,909, filed on Jan. 12, 2011, provisional application No. 61/426,479, filed on Dec. 22, 2010, provisional application No. 61/388,264, filed on Sep. 30, 2010.

(51) Int. Cl.
| | |
|---|---|
| *H04N 19/43* | (2014.01) |
| *H04N 19/182* | (2014.01) |
| *H04N 19/59* | (2014.01) |
| *H04N 19/523* | (2014.01) |
| *H04N 19/117* | (2014.01) |
| *H04N 19/82* | (2014.01) |
| *H04N 19/186* | (2014.01) |
| *G06T 3/40* | (2006.01) |
| *G06T 5/00* | (2006.01) |
| *G06F 17/17* | (2006.01) |

(52) U.S. Cl.
CPC ............ *H04N 19/186* (2014.11); *H04N 19/43* (2014.11); *H04N 19/523* (2014.11); *H04N 19/59* (2014.11); *H04N 19/635* (2014.11); *H04N 19/82* (2014.11); *G06F 17/17* (2013.01); *G06F 17/175* (2013.01); *G06T 3/4007* (2013.01); *G06T 5/002* (2013.01)

(56) References Cited

U.S. PATENT DOCUMENTS

| | | | |
|---|---|---|---|
| 7,366,240 | B2* | 4/2008 | Chiang Wei Yin et al. ................. 375/240.26 |
| 7,502,505 | B2 | 3/2009 | Malvar et al. |
| 7,643,676 | B2 | 1/2010 | Malvar |
| 8,687,709 | B2 | 4/2014 | Hsu et al. |
| 8,761,268 | B2* | 6/2014 | Xu et al. ................. 375/240.29 |
| 9,014,280 | B2 | 4/2015 | Ye et al. |
| 2005/0200733 | A1 | 9/2005 | Malvar |
| 2005/0201616 | A1 | 9/2005 | Malvar et al. |
| 2006/0146935 | A1 | 7/2006 | Winger |
| 2007/0140346 | A1 | 6/2007 | Chen et al. |
| 2008/0089417 | A1 | 4/2008 | Bao et al. |
| 2008/0240559 | A1 | 10/2008 | Malvar |
| 2010/0134425 | A1* | 6/2010 | Storrusten ................. 345/173 |
| 2012/0230423 | A1* | 9/2012 | Esenlik et al. ............ 375/240.24 |
| 2013/0094582 | A1 | 4/2013 | Wittmann et al. |
| 2013/0142267 | A1* | 6/2013 | Esenlik .............. H04N 19/0089 375/240.29 |
| 2013/0182763 | A1 | 7/2013 | Yasuda et al. |
| 2013/0272405 | A1* | 10/2013 | Jeon et al. ................ 375/240.15 |

FOREIGN PATENT DOCUMENTS

| | | |
|---|---|---|
| CN | 101523922 A | 9/2009 |
| CN | 100566413 C | 12/2009 |
| JP | 2000-123162 A | 4/2000 |
| JP | 2008-118447 A | 5/2008 |
| KR | 10-2006-0043650 A | 5/2006 |
| KR | 10-2007-0055212 A | 5/2007 |
| KR | 10-2009-0041562 A | 4/2009 |
| KR | 10-2009-0108654 A | 10/2009 |
| KR | 10-2010-0074137 | 7/2010 |
| WO | 2011/086777 A1 | 7/2011 |

OTHER PUBLICATIONS

Joint Collaborative Team—Video Coding, "Daegu Meeting—Document Register", online, http://phenix.it-sudparis.edu/jct/doc_end_user/current_meeting.php?id_meeting=143.*

M. Unser, "Splines: A Perfect Fit for Signal and Image Processing", 16 IEEE Signal Processing Mag. 22-38 (Nov. 1999).*

International Search Report (PCT/ISA/210), dated Apr. 18, 2012, issued by the International Searching Authority in corresponding International Application No. PCT/KR2011/007220.

Written Opinion (PCT/ISA/237), dated Apr. 18, 2012, issued by the International Searching Authority in corresponding International Application No. PCT/KR2011/007220.

McCann, K.,et al, Samsung's Response to the Call for Proposals on Video Compression Technology, Joint Collaborative Team on Video Coding (JCT-VC)of ITU-T SG16 WP3 and ISO/IEC JTC1/SC29/WG11 JCTVC-A124, Apr. 15, 2010, pp. 1-6 and 12-14,URL, http://wftp3.itu.int/av/arch/jctvc-site/2010_04_A_Dresden/JCTVC-A124_r2.doc.

Communication dated Aug. 30, 2014 issued by the Korean Intellectual Property Office in counterpart Korean Application No. 10-2011-0100037.

Communication dated Nov. 22, 2014 issued by the Korean Intellectual Property Office in counterpart Korean Patent Application No. 10-2014-0054354.

Communication dated Jan. 28, 2014 issued by the Japanese Patent Office in counterpart Japanese Patent Application No. 2013-531498.

Communication dated Feb. 23, 2015 issued by European Patent Office in counterpart European Application No. 11829611.0.

Communication dated Mar. 18, 2015 issued by European Patent Office in counterpart European Application No. 14193524.7.

Lim J. S., "Two-dimensional signal and image processing, PASSAGE," Two-dimensional Signal and Image Processing, Jan. 1 1990, 14 pages total, Prentice Hall New Jersey, USA, XP 002735768.

Wolberg G., "Image Resampling", Digital Image Warping, Jan. 1, 1992, 47 pages total, IEE Computer Society Press, Los Alamitos, California, USA, XP002678301.

Alshina et al., "CE3: Experimental results of DCTIF by Samsung", JCT/VC Meeting, Jan. 20-28, 2011, 15 pages total, URL:http://wftp3.itu.int/av-arch/jctvc-site/, XP 030008383.

Alshina et al., "CE3: DCT derived interpolation filter test by Samsung", MPEG Meeting, Jul. 14-22, 2011, 10 pages total, URL:http://wftp3.itu.int/av-arch/jctvc-site/, XP 030009270.

Burger et al., "Digital Image Processing, An Algorithmic Introduction using Java", Jan. 1, 2008, 4 pages total, Springer, USA, XP 05517885.

Karczewicz et al., "Video coding technology proposal by Qualcomm Inc.", JCT-VC Meeting, Apr. 15-23, 2010, 25 pages total, URL: http://wftp3.itu.int/av-arch/jctvc-site/, XP 030007567.

McCann et al., "High Efficiency Video Coding (HEVC) Test model 2 (HM 2) Encoder Description", JCT-VC Meeting, Apr. 15, 2011, 28 pages total, URL:http://wftp3.itu.int/av-arch/jctvc-site/, XP 030113314.

Chen et al., "CE4: Experimental results of DCTIF application for Chroma MC by Samsung", JCT-VC Meeting, Jan. 20-28, 2011, 6 pages total, URL:http://wftp3.itu.int/av-arch/jctvc-site/; XP 300008386.

Communication issued on Jul. 24, 2015 by The State Intellectual Property Office of PR China in related Application No. 201180057602.5.

Communication issued on Jul. 28, 2015 by the Japanese Patent Office in related Application No. 2014-235539.

Triggs et al., "Empirical Filter Estimation for Subpixel Interpolation and Matching", CNRS-INRIA, 8th IEEE International Conference on Computer Vision, vol. 2, 8 total pages, 2001.

Chujoh et al., "Description of Video Coding Technology Proposal by Toshiba", Joint Collaborative Team on Video Coding (JCT-VC) of ITU-T SG16 WP3 and ISO/IEC JTC1.SC29.WG11, 1st Meeting, Apr. 15-23, 2010, 3 total pages.

Anonymous, "Advanced Video Coding for Generic Audiovisual Services", ITU-T, Telecommunication Standardization Sector of ITU, May 2003, 4 total pages.

* cited by examiner

FIG. 8A

| β | α | Filter coefficients (12-tap) |
|---|---|---|
| 0 | 1/8 | { -1, 4, -7, 13, -26, 249, 35, -16, 9, -6, 3, -1 } |
| | 1/4 | { -2, 7, -13, 22, -44, 230, 76, -31, 18, -11, 6, -2 } |
| | 3/8 | { -3, 8, -16, 27, -52, 200, 120, -44, 24, -15, 8, -3 } |
| | 1/2 | { -3, 9, -16, 28, -52, 162, 162, -52, 28, -16, 9, -3 } |
| | 5/8 | { -3, 8, -15, 24, -44, 120, 200, -52, 27, -16, 8, -3 } |
| | 3/4 | { -2, 6, -11, 18, -31, 76, 230, -44, 22, -13, 7, -2 } |
| | 7/8 | { -1, 3, -6, 9, -16, 35, 249, -26, 13, -7, 4, -1 } |
| 0.002 | 1/8 | { -1, 4, -7, 12, -24, 246, 37, -16, 9, -5, 3, -1 } |
| | 1/4 | { -2, 6, -12, 20, -40, 225, 77, -30, 17, -10, 6, -2 } |
| | 3/8 | { -2, 8, -14, 24, -46, 194, 119, -40, 22, -13, 7, -2 } |
| | 1/2 | { -2, 8, -14, 24, -45, 158, 158, -45, 24, -14, 8, -2 } |
| | 5/8 | { -2, 7, -13, 22, -40, 119, 194, -46, 24, -14, 8, -2 } |
| | 3/4 | { -2, 6, -10, 17, -30, 77, 225, -40, 20, -12, 6, -2 } |
| | 7/8 | { -1, 3, -5, 9, -16, 37, 246, -24, 12, -7, 4, -1 } |
| 0.004 | 1/8 | { -1, 3, -6, 11, -22, 243, 38, -16, 9, -5, 3, -1 } |
| | 1/4 | { -2, 6, -11, 18, -36, 220, 78, -29, 16, -10, 5, -2 } |
| | 3/8 | { -2, 7, -12, 21, -41, 189, 118, -37, 20, -12, 6, -2 } |
| | 1/2 | { -2, 7, -12, 21, -39, 154, 154, -39, 21, -12, 7, -2 } |
| | 5/8 | { -2, 6, -12, 20, -37, 118, 189, -41, 21, -12, 7, -2 } |
| | 3/4 | { -2, 5, -10, 16, -29, 78, 220, -36, 18, -11, 6, -2 } |
| | 7/8 | { -1, 3, -5, 9, -16, 38, 243, -22, 11, -6, 3, -1 }<br>{ -1, 3, -5, 9, -15, 39, 242, -21, 11, -6, 3, -1 } |
| 0.006 | 1/8 | { -1, 3, -6, 10, -20, 241, 39, -15, 9, -5, 3, -1 } |
| | 1/4 | { -2, 5, -10, 17, -32, 216, 79, -27, 15, -9, 5, -2 } |
| | 3/8 | { -2, 6, -11, 19, -35, 184, 117, -34, 18, -11, 6, -2 } |
| | 1/2 | { -2, 6, -11, 18, -34, 150, 150, -34, 18, -11, 6, -2 } |
| | 5/8 | { -2, 6, -11, 18, -34, 117, 184, -35, 19, -11, 6, -2 } |
| | 3/4 | { -2, 5, -9, 15, -27, 79, 216, -32, 17, -10, 5, -2 } |
| | 7/8 | { -1, 3, -5, 9, -15, 39, 241, -20, 10, -6, 3, -1 } |

FIG. 8B

| β | α | Filter coefficients (12-tap) |
|---|---|---|
| 0.008 | 1/8 | { -1, 3, -6, 10, -18, 238, 40, -15, 9, -5, 3, -1 } |
|  | 1/4 | { -2, 5, -9, 15, -28, 211, 80, -26, 14, -8, 5, -1 } |
|  | 3/8 | { -2, 5, -10, 17, -31, 180, 117, -31, 17, -10, 5, -2 } |
|  | 1/2 | { -2, 5, -9, 16, -28, 147, 147, -28, 16, -9, 5, -2 } |
|  | 5/8 | { -2, 5, -10, 17, -31, 117, 180, -31, 17, -10, 5, -2 } |
|  | 3/4 | { -1, 5, -8, 14, -26, 80, 211, -28, 15, -9, 5, -2 } |
|  | 7/8 | { -1, 3, -5, 9, -15, 40, 238, -18, 10, -6, 3, -1 } |
| 0.010 | 1/8 | { -1, 3, -5, 9, -16, 235, 41, -15, 8, -5, 3, -1 } |
|  | 1/4 | { -1, 4, -8, 14, -24, 207, 81, -25, 14, -8, 4, -1 } |
|  | 3/8 | { -2, 5, -9, 15, -26, 175, 116, -28, 15, -9, 5, -2 } |
|  | 1/2 | { -1, 4, -8, 13, -24, 143, 143, -24, 13, -8, 4, -1 } |
|  | 5/8 | { -2, 5, -9, 15, -28, 116, 175, -26, 15, -9, 5, -2 } |
|  | 3/4 | { -1, 4, -8, 14, -25, 81, 207, -24, 14, -8, 4, -1 } |
|  | 7/8 | { -1, 3, -5, 8, -15, 41, 235, -16, 9, -5, 3, -1 } |
| 0.012 | 1/8 | { -1, 3, -5, 9, -15, 233, 43, -15, 8, -5, 3, -1 } |
|  | 1/4 | { -1, 4, -7, 12, -21, 203, 82, -24, 13, -8, 4, -1 } |
|  | 3/8 | { -1, 4, -8, 13, -22, 171, 115, -25, 14, -8, 4, -1 } |
|  | 1/2 | { -1, 4, -7, 11, -19, 140, 140, -19, 11, -7, 4, -1 } |
|  | 5/8 | { -1, 4, -8, 14, -25, 115, 171, -22, 13, -8, 4, -1 } |
|  | 3/4 | { -1, 4, -8, 13, -24, 82, 203, -21, 12, -7, 4, -1 } |
|  | 7/8 | { -1, 3, -5, 8, -15, 43, 233, -15, 9, -5, 3, -1 } |
| 0.014 | 1/8 | { -1, 3, -5, 8, -13, 230, 44, -15, 8, -5, 3, -1 } |
|  | 1/4 | { -1, 4, -7, 11, -18, 199, 82, -23, 12, -7, 4, -1 } |
|  | 3/8 | { -1, 4, -7, 11, -18, 167, 114, -22, 12, -7, 4, -1 } |
|  | 1/2 | { -1, 3, -6, 10, -15, 137, 137, -15, 10, -6, 3, -1 } |
|  | 5/8 | { -1, 4, -7, 12, -22, 114, 167, -18, 11, -7, 4, -1 } |
|  | 3/4 | { -1, 4, -7, 12, -23, 82, 199, -18, 11, -7, 4, -1 } |
|  | 7/8 | { -1, 3, -5, 8, -15, 44, 230, -13, 8, -5, 3, -1 } |

FIG. 8C

| β | α | Filter coefficients (12-tap) |
|---|---|---|
| 0.016 | 1/8 | { -1, 2, -4, 7, -11, 228, 45, -15, 8, -5, 3, -1 } |
| | 1/4 | { -1, 3, -6, 10, -15, 196, 83, -21, 11, -7, 4, -1 } |
| | 3/8 | { -1, 3, -6, 10, -14, 164, 113, -20, 11, -6, 3, -1 } |
| | 1/2 | { -1, 3, -5, 8, -11, 134, 134, -11, 8, -5, 3, -1 } |
| | 5/8 | { -1, 3, -6, 11, -20, 113, 164, -14, 10, -6, 3, -1 } |
| | 3/4 | { -1, 4, -7, 11, -21, 83, 196, -15, 10, -6, 3, -1 } |
| | 7/8 | { -1, 3, -5, 8, -15, 45, 228, -11, 7, -4, 2, -1 } |
| 0.018 | 1/8 | { -1, 2, -4, 7, -9, 225, 46, -15, 8, -5, 2, -1 } |
| | 1/4 | { -1, 3, -6, 9, -12, 192, 84, -20, 11, -6, 3, -1 } |
| | 3/8 | { -1, 3, -5, 9, -10, 160, 112, -17, 10, -6, 3, -1 } |
| | 1/2 | { -1, 2, -4, 7, -8, 131, 131, -8, 7, -4, 2, -1 } |
| | 5/8 | { -1, 3, -6, 10, -17, 112, 160, -10, 9, -5, 3, -1 } |
| | 3/4 | { -1, 3, -6, 11, -20, 84, 192, -12, 9, -6, 3, -1 } |
| | 7/8 | { -1, 2, -5, 8, -15, 46, 225, -9, 7, -4, 2, -1 } |
| 0.020 | 1/8 | { -1, 2, -4, 6, -8, 223, 47, -14, 8, -5, 2, -1 } |
| | 1/4 | { -1, 3, -5, 8, -9, 189, 84, -19, 10, -6, 3, -1 } |
| | 3/8 | { -1, 3, -5, 7, -7, 157, 111, -15, 9, -5, 3, -1 } |
| | 1/2 | { -1, 2, -4, 6, -4, 129, 129, -4, 6, -4, 2, -1 } |
| | 5/8 | { -1, 3, -5, 9, -15, 111, 157, -7, 7, -5, 3, -1 } |
| | 3/4 | { -1, 3, -6, 10, -19, 84, 189, -9, 8, -5, 3, -1 } |
| | 7/8 | { -1, 2, -5, 8, -14, 47, 223, -8, 6, -4, 2, -1 } |

FIG. 9A

| β | α | Filter coefficients (6-tap) |
|---|---|---|
| 0 | 1/8 | { 5, -23, 247, 35, -13, 4 } |
| | 1/4 | { 9, -37, 227, 75, -25, 7 } |
| | 3/8 | { 11, -43, 197, 117, -36, 10 } |
| | 1/2 | { 11, -43, 159, 159, -43, 11 } |
| | 5/8 | { 10, -36, 117, 197, -43, 11 } |
| | 3/4 | { 7, -25, 75, 227, -37, 9 } |
| | 7/8 | { 4, -13, 35, 247, -23, 5 } |
| 0.002 | 1/8 | { 5, -22, 247, 35, -13, 4 } |
| | 1/4 | { 9, -36, 226, 75, -25, 7 } |
| | 3/8 | { 11, -42, 196, 117, -35, 10 } |
| | 1/2 | { 11, -41, 158, 158, -41, 11 } |
| | 5/8 | { 10, -35, 117, 196, -42, 11 } |
| | 3/4 | { 7, -25, 75, 226, -36, 9 } |
| | 7/8 | { 4, -13, 35, 247, -22, 5 } |
| 0.004 | 1/8 | { 5, -22, 246, 35, -13, 4 } |
| | 1/4 | { 9, -35, 225, 75, -25, 7 } |
| | 3/8 | { 11, -41, 194, 117, -35, 9 } |
| | 1/2 | { 11, -40, 157, 157, -40, 11 } |
| | 5/8 | { 9, -35, 117, 194, -41, 11 } |
| | 3/4 | { 7, -25, 75, 225, -35, 9 } |
| | 7/8 | { 4, -13, 35, 246, -22, 5 } |
| 0.006 | 1/8 | { 5, -21, 245, 36, -13, 4 } |
| | 1/4 | { 9, -34, 224, 76, -25, 7 } |
| | 3/8 | { 10, -40, 193, 117, -34, 9 } |
| | 1/2 | { 10, -39, 156, 156, -39, 10 } |
| | 5/8 | { 9, -34, 117, 193, -40, 10 } |
| | 3/4 | { 7, -25, 76, 224, -34, 9 } |
| | 7/8 | { 4, -13, 36, 245, -21, 5 } |

FIG. 9B

| β | α | Filter coefficients (6-tap) |
|---|---|---|
| 0.008 | 1/8 | { 5, −21, 245, 36, −13, 4 } |
| | 1/4 | { 8, −33, 223, 76, −25, 7 } |
| | 3/8 | { 10, −38, 192, 117, −33, 9 } |
| | 1/2 | { 10, −37, 155, 155, −37, 10 } |
| | 5/8 | { 9, −33, 117, 192, −38, 10 } |
| | 3/4 | { 7, −25, 76, 223, −33, 8 } |
| | 7/8 | { 4, −13, 36, 245, −21, 5 } |
| 0.010 | 1/8 | { 5, −20, 244, 36, −13, 4 } |
| | 1/4 | { 8, −32, 221, 76, −24, 7 } |
| | 3/8 | { 10, −37, 191, 117, −35, 9 } |
| | 1/2 | { 10, −36, 154, 154, −36, 10 } |
| | 5/8 | { 9, −33, 117, 191, −37, 10 } |
| | 3/4 | { 7, −24, 76, 221, −32, 8 } |
| | 7/8 | { 4, −13, 36, 244, −20, 5 } |
| 0.012 | 1/8 | { 5, −20, 243, 37, −13, 4 } |
| | 1/4 | { 8, −32, 220, 77, −24, 7 } |
| | 3/8 | { 9, −36, 189, 117, −32, 9 } |
| | 1/2 | { 9, −35, 154, 154, −35, 9 } |
| | 5/8 | { 9, −32, 117, 189, −36, 9 } |
| | 3/4 | { 7, −24, 77, 220, −32, 8 } |
| | 7/8 | { 4, −13, 37, 243, −20, 5 } |
| 0.014 | 1/8 | { 5, −19, 243, 37, −13, 4 } |
| | 1/4 | { 8, −31, 219, 77, −24, 7 } |
| | 3/8 | { 9, −35, 188, 116, −31, 8 } |
| | 1/2 | { 9, −34, 153, 153, −34, 9 } |
| | 5/8 | { 8, −31, 116, 188, −35, 9 } |
| | 3/4 | { 7, −24, 77, 219, −31, 8 } |
| | 7/8 | { 4, −13, 37, 243, −19, 5 } |

FIG. 9C

| β | α | Filter coefficients (6-tap) |
|---|---|---|
| 0.016 | 1/8 | { 5, -19, 242, 37, -13, 4 } |
| | 1/4 | { 8, -30, 218, 77, -24, 6 } |
| | 3/8 | { 9, -34, 187, 116, -31, 8 } |
| | 1/2 | { 9, -32, 152, 152, -32, 9 } |
| | 5/8 | { 8, -31, 116, 187, -34, 9 } |
| | 3/4 | { 6, -24, 77, 218, -30, 8 } |
| | 7/8 | { 4, -13, 37, 242, -19, 5 } |
| 0.018 | 1/8 | { 5, -18, 241, 37, -13, 4 } |
| | 1/4 | { 7, -29, 217, 77, -23, 6 } |
| | 3/8 | { 9, -33, 186, 116, -30, 6 } |
| | 1/2 | { 8, -31, 151, 151, -31, 8 } |
| | 5/8 | { 8, -30, 116, 186, -33, 9 } |
| | 3/4 | { 6, -23, 77, 217, -29, 7 } |
| | 7/8 | { 4, -13, 37, 241, -18, 5 } |
| 0.020 | 1/8 | { 5, -18, 241, 38, -13, 4 } |
| | 1/4 | { 7, -28, 216, 78, -23, 6 } |
| | 3/8 | { 8, -32, 185, 116, -29, 8 } |
| | 1/2 | { 8, -30, 150, 150, -30, 8 } |
| | 5/8 | { 8, -29, 116, 185, -32, 8 } |
| | 3/4 | { 6, -23, 78, 216, -28, 7 } |
| | 7/8 | { 4, -13, 38, 241, -18, 5 } |

FIG. 10

| β | α | Filter coefficients (6-tap) |
|---|---|---|
| for chroma | 1/8 | { 5, -20, 243, 37, -13, 4 } |
| | 1/4 | { 8, -32, 220, 77, -24, 7 } |
| | 3/8 | { 9, -36, 189, 117, -32, 9 } |
| | 1/2 | { 9, -35, 154, 154, -35, 9 } |

FIG. 11

| 2M | α | Filter coefficients $F_m(\alpha)$ | L/C |
|---|---|---|---|
| 4 | 1/4 | { -24, 223, 72, -15 } | L |
| 4 | 1/2 | { -19, 147, 147, -19 } | L |
| 6 | 1/4 | { 8, -35, 227, 73, -23, 6 } | L |
| 6 | 1/2 | { 5, -33, 156, 156, -33, 5 } | L |
| 8 | 1/4 | { -4, 15, -39, 228, 74, -26, 11, -3 } | L |
| 8 | 1/4 | { -3, 13, -38, 228, 73, -24, 9, -2 } | L |
| 8 | 1/2 | { -3, 12, -40, 159, 159, -40, 12, -3 } | L |
| 12 | 1/4 | { -2, 5, -9, 18, -41, 229, 76, -30, 16, -9, 4, -1 } | L |
| 12 | 1/2 | { -1, 4, -10, 22, -48, 161, 161, -48, 22, -10, 4, -1 } | L |
| 12 | 1/2 | { -1, 3, -8, 19, -45, 160, 160, -45, 19, -8, 3, -1 } | L |
| 4 | 1/8 | { -12, 242, 30, -4 } | C |
| 4 | 1/4 | { -18, 218, 65, -9 } | C |
| 4 | 3/8 | { -19, 184, 105, -14 } | C |
| 4 | 1/2 | { -17, 145, 145, -17 } | C |
| 4 | 1/8 | { -9, 236, 34, -5 } | C |
| 4 | 1/4 | { -14, 210, 70, -10 } | C |
| 4 | 3/8 | { -16, 179, 107, -14 } | C |
| 4 | 1/2 | { -16, 144, 144, -16 } | C |
| 6 | 1/8 | { 1, -13, 241, 34, -8, 1 } | C |
| 6 | 1/4 | { 2, -22, 217, 72, -15, 2 } | C |
| 6 | 3/8 | { 3, -25, 185, 111, -21, 3 } | C |
| 6 | 1/2 | { 3, -25, 150, 150, -25, 3 } | C |
| 6 | 1/8 | { 3, -16, 243, 34, -10, 2 } | C |
| 6 | 1/4 | { 5, -26, 220, 73, -19, 3 } | C |
| 6 | 3/8 | { 6, -31, 189, 114, -27, 5 } | C |
| 6 | 1/2 | { 5, -30, 153, 153, -30, 5 } | C |
| 6 | 1/8 | { 2, -16, 244, 31, -6, 1 } | C |
| 6 | 1/4 | { 3, -24, 221, 68, -14, 2 } | C |
| 6 | 3/8 | { 3, -27, 188, 110, -20, 2 } | C |
| 6 | 1/2 | { 3, -25, 150, 150, -25, 3 } | C |
| 12 | 1/8 | { -1, 2, -4, 10, -24, 248, 35, -14, 7, -4, 2, -1 } | L |
| 12 | 3/8 | { -1, 4, -9, 20, -46, 197, 118, -39, 18, -8, 3, -1 } | L |

FIG. 12A

| 2M | α | Scaling factor ($2^n$) | Filter coefficients $F_m(\alpha)$ |
|---|---|---|---|
| 8 | 1/4 | 512 | { -7, 29, -77, 456, 148, -52, 21, -6 } |
| | | 256 | { -4, 15, -39, 228, 74, -26, 11, -3 } |
| | | 128 | { -2, 7, -19, 114, 37, -13, 5, -1 } |
| | | 64 | { -1, 4, -10, 57, 18, -6, 3, -1 }<br>{ -1, 4, -10, 57, 19, -7, 3, -1 } |
| | 1/2 | 512 | {-5, 23, -79, 317, 317, -79, 23, -5} |
| | | 256 | { -3, 12, -40, 159, 159, -40, 12, -3 } |
| | | 128 | { -1, 6, -20, 79, 79, -20, 6, -1 } |
| | | 64 | { -1, 3, -10, 40, 40, -10, 3, -1 }<br>{ -1, 5, -12, 40, 40, -12, 5, -1 }<br>{ -1, 4, -11, 40, 40, -11, 4, -1 } |
| | 1/8 | 256 | { -3, 10, -25, 248, 36, -15, 7, -2 }<br>{ -2, 8, -24, 249, 34, -13, 5, -1 } |
| | | 128 | {-1, 4, -12, 123, 18, -6, 3, -1} |
| | | 64 | {-1, 3, -6, 62, 9, -4, 2, -1}<br>{-1, 2, -6, 62, 9, -4, 2, 0}<br>{-1, 2, -6, 62, 9, -3, 1, 0} |
| | 3/8 | 256 | {-6, 21, -49, 199, 119, -41, 19, -6}<br>{-6, 21, -48, 198, 119, -41, 19, -6}<br>{-4, 16, -44, 197, 117, -36, 13, -3} |
| | | 128 | {-3, 10, -24, 99, 59, -20, 9, -2} |
| | | 64 | {-2, 5, -11, 50, 29, -10, 5, -2}<br>{-2, 5, -12, 50, 30, -10, 4, -1} |

FIG. 12B

| 2M | α | Scaling factor ($2^n$) | Filter coefficients $F_m(α)$ |
|---|---|---|---|
| 4 | 1/8 | 512 | { -23, 483, 59, -7 } |
| | | 256 | { -12, 242, 30, -4 } |
| | | 128 | { -5, 121, 14, -2 } |
| | | 64 | { -3, 60, 8, -1 }<br>{ -3, 61, 7, -1 } |
| | | 32 | { -1, 30, 4, -1 }<br>{ -2, 30, 4, 0 } |
| | 1/4 | 512 | {-48, 446, 145, -31} |
| | | 256 | {-24, 223, 72, -15} |
| | | 128 | {-12, 111, 36, -7} |
| | | 64 | { -4, 54, 16, -2 } |
| | | 32 | { -2, 27, 8, -1 } |
| | 3/8 | 512 | {-55, 384, 227, -44} |
| | | 256 | {-27, 192, 114, -21} |
| | | 128 | {-14, 96, 57, -11}<br>{-13, 95, 56, -10} |
| | | 64 | { -4, 46, 25, -3 }<br>{ -5, 46, 26, -3 }<br>{ -5, 46, 27, -4 } |
| | | 32 | { -2, 23, 12, -1 }<br>{ -2, 23, 13, -2 } |
| | 1/2 | 512 | { -33, 289, 289, -33 } |
| | | 256 | { -17, 145, 145, -17 } |
| | | 128 | { -8, 72, 72, -8 } |
| | | 64 | { -4, 36, 36, -4 } |
| | | 32 | { -2, 18, 18, -2 } |
| | | 16 | { -1, 9, 9, -1 } |

FIG. 12C
| 2M | Scaling factor ($2^n$) | α | Filter coefficients $F_m(\alpha)$ |
|---|---|---|---|
| 6 | $64(=2^6)$ | 1/4 | { 2, −9, 57, 19, −7, 2 }<br>{ 2, −9, 57, 19, −6, 1 }<br>{ 2, −9, 57, 20, −7, 1 } |
| | | 1/2 | { 1, −7, 38, 38, −7, 1 }<br>{ 1, −8, 39, 39, −8, 1 }<br>{ 2, −9, 39, 39, −9, 2 } |
| 4 | $32(=2^5)$ | 1/8 | { −1, 29, 5, −1 } |
| | | 1/4 | { −2, 27, 8, −1 } |
| | | 3/8 | { −3, 23, 14, −2 } |
FIG. 13A
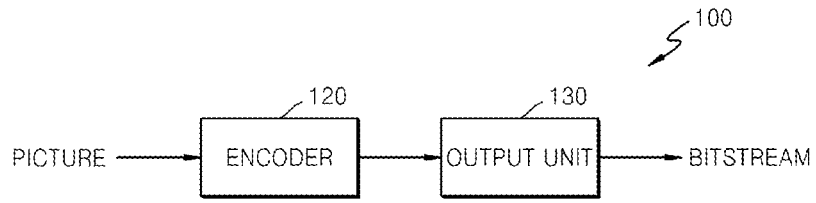
FIG. 13B
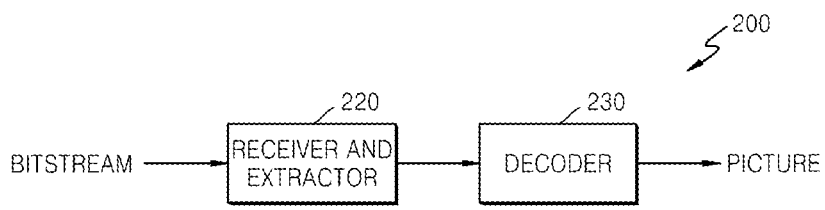

'PARTITION TYPE'-INFORMATION (800)

'PREDICTION MODE'-INFORMATION (810)

'SIZE OF TRANSFORMATION UNIT'-INFORMATION (820)

METHOD AND DEVICE FOR INTERPOLATING IMAGES BY USING A SMOOTHING INTERPOLATION FILTER

CROSS-REFERENCE TO RELATED APPLICATIONS

This application is a Continuation of U.S. patent application Ser. No. 13/877,074, filed on Mar. 29, 2013, which is a National Stage application under 35 U.S.C. §371 of International Application No. PCT/KR2011/007220, filed on Sep. 30, 2011, which claims the benefit of U.S. Provisional Application No. 61/388,264, filed on Sep. 30, 2010 in the United States Patent and Trademark Office (USPTO), U.S. Provisional Application No. 61/426,479, filed on Dec. 22, 2010 in the USPTO, U.S. Provisional Application No. 61/431,909, filed on Jan. 12, 2011 in the USPTO, and U.S. Provisional Application No. 61/450,775, filed on Mar. 9, 2011 in the USPTO, the disclosures of which are incorporated herein by reference in their entireties.

BACKGROUND

1. Field

Apparatuses and methods consistent with exemplary embodiments relate to prediction encoding using motion compensation.

2. Description of the Related Art

In related art image encoding and decoding methods, in order to encode an image, one picture is split into macro blocks. After that, prediction encoding is performed on each macro block by using inter prediction or intra prediction.

Inter prediction refers to a method of compressing an image by removing temporal redundancy between pictures and a representative example thereof is motion estimation encoding. In motion estimation encoding, each block of a current picture is predicted by using at least one reference picture. A reference block that is most similar to a current block is found within a predetermined search range by using a predetermined evaluation function.

A current block is predicted based on a reference block, and a residual block obtained by subtracting, from the current block, a prediction block generated as a prediction result is encoded. In this case, in order to more accurately perform prediction, interpolation is performed on a range of searching the reference picture, sub-pel-unit pixels smaller than integer-pel-unit pixels are generated, and inter prediction is performed on the generated sub-pel-unit pixels.

SUMMARY

One or more exemplary embodiments provide a method and apparatus for determining appropriate interpolation filter coefficients in consideration of image characteristics so as to generate a sub-pel-unit pixel by interpolating integer-pel-unit pixels.

According to an aspect of an exemplary embodiment, there is provided a method of interpolating an image in consideration of smoothing, the method including: differently selecting an interpolation filter based on a sub-pel-unit interpolation location and a smoothness from among interpolation filters for generating at least one sub-pel-unit pixel value located between integer-pel-unit pixels; and generating the at least one sub-pel-unit pixel value by interpolating pixel values of the integer-pel-unit pixels by using the selected interpolation filter.

The interpolation filter may include filter coefficients for transforming the integer-pel-unit pixels based on a plurality of basis functions and inversely transforming a plurality of coefficients generated as a result of the transforming.

The interpolation filter may include filter coefficients having the smoothness determined based on a distance between the interpolation location and the integer-pel-unit pixels.

The interpolation filters may include filter coefficients having the smoothness determined based on a distance between the interpolation location and integer-pel-unit pixels adjacent to the interpolation location.

In order to interpolate the integer-pel-unit pixels in a spatial domain, the interpolation filter may include filter coefficients obtained by combining a filter for performing transformation and inverse transformation using the plurality of basis functions, and a window function, and the window function may be symmetric with respect to the interpolation location.

In order to interpolate the integer-pel-unit pixels in a spatial domain, the interpolation filter may include filter coefficients obtained by combining a filter for performing transformation and inverse transformation using the plurality of basis functions, and a smoothing parameter, and the smoothing parameter may control at least one of a smoothing speed and a smoothing range.

The interpolation filter may include filter coefficients based on a spline function. The interpolation filter may include filter coefficients for maximizing a low-frequency response of the interpolation filter based on a polynomial function.

The selecting of the interpolation filter may include selecting an interpolation filter including filter coefficients scaled to integers, from among the interpolation filters, and the generating of the at least one sub-pel-unit pixel value may include normalizing the at least one sub-pel-unit pixel value generated by using the selected interpolation filter, based on a scaling factor.

The selecting of the interpolation filter may include differently selecting an interpolation filter based on pixel characteristics from among the interpolation filters, and the generating of the at least one sub-pel-unit pixel value may include generating the at least one sub-pel-unit pixel value by using the interpolation filter differently selected based on the pixel characteristics.

According to an aspect of another exemplary embodiment, there is provided an apparatus for interpolating an image in consideration of smoothing, the apparatus including: a filter selector for differently selecting an interpolation filter based on a sub-pel-unit interpolation location and a smoothness from among interpolation filters for generating at least one sub-pel-unit pixel value located between integer-pel-unit pixels; and an interpolator for generating the at least one sub-pel-unit pixel value by interpolating pixel values of the integer-pel-unit pixels by using the selected interpolation filter.

According to an aspect of another exemplary embodiment, there is provided a method of interpolating an image in consideration of a color component, the method including: differently selecting an interpolation filter based on a sub-pel-unit interpolation location and a color component of a current pixel from among interpolation filters for generating at least one sub-pel-unit pixel value located between integer-pel-unit pixels; and generating the at least one sub-pel-unit pixel value by interpolating pixel values of the integer-pel-unit pixels by using the selected interpolation filter.

The selecting of the interpolation filter may include, in order to interpolate a chroma pixel, selecting an interpolation filter having a smoothness stronger than that of an interpolation filter for a luma pixel, from among the interpolation filters.

The interpolation filter having a smoothness stronger than that of the interpolation filter for a luma pixel may be one of a filter including filter coefficients for smoothing the integer-pel-unit pixels, transforming the smoothed integer-pel-unit pixels by using a plurality of basis functions, and inversely transforming a plurality of coefficients generated as a result of the transforming; a filter obtained by combining filter coefficients for performing transformation and inverse transformation by using the plurality of basis functions, and window function coefficients for performing low pass filtering; a filter including filter coefficients for most strongly smoothing boundary integer-pel-unit pixels based on a boundary condition of a spline function; and a filter including filter coefficients for maximizing a low-frequency response of an interpolation filter based on a polynomial function.

According to an aspect of another exemplary embodiment, there is provided an apparatus for interpolating an image in consideration of a color component, the apparatus including: a filter selector for differently selecting an interpolation filter based on a sub-pel-unit interpolation location and a color component of a current pixel from among interpolation filters for generating at least one sub-pel-unit pixel value located between integer-pel-unit pixels; and an interpolator for generating the at least one sub-pel-unit pixel value by interpolating pixel values of the integer-pel-unit pixels by using the selected interpolation filter.

According to an aspect of another exemplary embodiment, there is provided a video encoder using an image interpolation filter, the video encoder including: an encoder for differently selecting an interpolation filter based on a sub-pel-unit interpolation location and a smoothness from among interpolation filters stored in the video encoder, with respect to each block of an input picture, performing prediction encoding to generate at least one sub-pel-unit pixel value by interpolating pixel values of integer-pel-unit pixels by using the selected interpolation filter, and performing transformation and quantization on a prediction result of the prediction encoding; an output unit for outputting a bitstream generated by performing entropy encoding on quantized transformation coefficients and encoding information; and a storage for storing filter coefficients of the interpolation filters.

According to an aspect of another exemplary embodiment, there is provided a video decoder using an image interpolation filter, the video decoder including: a receiver and extractor for receiving an encoded bitstream of a video and extracting encoding information and encoded data of a picture of the video by performing entropy decoding and parsing on the bitstream; a decoder for performing inverse quantization and inverse transformation on quantized transformation coefficients of the encoded data of a current block of the picture, differently selecting an interpolation filter based on a sub-pel-unit interpolation location and a smoothness from among interpolation filters stored in the video decoder, performing prediction decoding to generate at least one sub-pel-unit pixel value by interpolating pixel values of integer-pel-unit pixels by using the selected interpolation filter, and reconstructing the picture; and a storage for storing filter coefficients of the interpolation filters.

According to an aspect of another exemplary embodiment, there is provided a computer-readable recording medium having recorded thereon a computer program for executing the above method.

When a video is encoded and decoded, since a high-quality image is generated by interpolating a reference frame and motion estimation and compensation are performed based on the high-quality image, the accuracy of inter prediction may be increased. Also, since a smoothing interpolation filter is used to reduce high-frequency components in an interpolation result and thus a smoother interpolation result is obtained, high-frequency components may be removed and the efficiency of image encoding and image decoding may be improved.

DESCRIPTION OF THE DRAWINGS

FIGS. 8A through 8C are tables showing filter coefficients of 12-tap interpolation filters determined based on a smoothing parameter and an interpolation location, according to exemplary embodiments;

FIGS. 9A through 9C are tables showing filter coefficients of 6-tap interpolation filters determined based on a smoothing parameter and an interpolation location, according to exemplary embodiments;

FIG. 10 is a table showing filter coefficients of 6-tap interpolation filters determined for chroma pixels based on a smoothing parameter and an interpolation location, according to an exemplary embodiment;

FIG. 11 is a table showing filter coefficients of smoothing interpolation filters differently determined based on a color component and an image interpolation location, according to an exemplary embodiment;

FIGS. 12A through 12C are tables showing filter coefficients of smoothing interpolation filters based on an image interpolation location and a scaling factor, according to exemplary embodiments;

FIG. 13A is a block diagram of a video encoding apparatus using a smoothing interpolation filter, according to an exemplary embodiment;

FIG. 13B is a block diagram of a video decoding apparatus using a smoothing interpolation filter, according to an exemplary embodiment;

DETAILED DESCRIPTION OF EXEMPLARY EMBODIMENTS

The description below and the attached drawings are provided to gain an understanding of operations according to exemplary embodiments. Descriptions of elements or operations that may be easily implemented by one of ordinary skill in the art may be omitted.

The description and the drawings are not provided for limitation, and the scope of the inventive concept should be defined by the appended claims. The meaning of the terms used in the present specification and claims should be construed as meanings and concepts not departing from the spirit and scope of the inventive concept based on the principle that the inventor is capable of defining concepts of terms in order to describe exemplary embodiments in the most appropriate way.

Hereinafter, exemplary embodiments will be described with reference to the attached drawings.

In the following description, an 'image' may comprehensively refer to a moving image such as a video, as well as a still image.

Image interpolation considering smoothing, according to an exemplary embodiment, is disclosed with reference to FIGS. 1 through 3, 4A through 4C, 5 through 7, 8A through 8C, 9A through 9C, 10, 11, and 12A through 12C. Also, video encoding and decoding using a smoothing interpolation filter, according to an exemplary embodiment, are disclosed with reference to FIGS. 13A, 13B, 14A, 14B, and 15 through 27. Specifically, video encoding and decoding using a smoothing interpolation filter based on coding units having a tree structure, according to an exemplary embodiment, are disclosed with reference to FIGS. 15 through 27.

Image interpolation considering smoothing and a smoothing interpolation filter, according to exemplary embodiments, will now be described in detail with reference to FIGS. 1 through 3, 4A through 4C, 5 through 7, 8A through 8C, 9A through 9C, 10, 11, and 12A through 12C.

Figure 1:
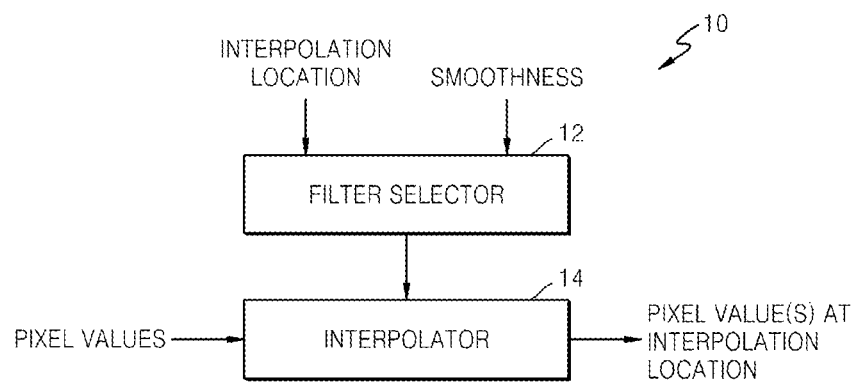
FIG. 1 is a block diagram of an image interpolation apparatus according to an exemplary embodiment.

FIG. 1 is a block diagram of an image interpolation apparatus 10 according to an exemplary embodiment.

The image interpolation apparatus 10 considering smoothing includes a filter selector 12 and an interpolator 14. Operations of the filter selector 12 and the interpolator 14 of the image interpolation apparatus 10 may be cooperatively controlled by a video encoding processor, a central processing unit (CPU), and a graphic processor.

The image interpolation apparatus 10 may receive an input image and may generate sub-pel-unit pixel values by interpolating integer-pel-unit pixels. The input image may be a picture sequence, a picture, a frame, or blocks of a video.

The filter selector 12 may differently select an interpolation filter for generating at least one sub-pel-unit pixel value located between integer-pel units, based on a sub-pel-unit interpolation location and a smoothness.

The interpolator 14 may interpolate integer-pel-unit pixels adjacent to the sub-pel-unit interpolation location by using the interpolation filter selected by the filter selector 12, thereby generating sub-pel-unit pixel values. Interpolation filtering of integer-pel-unit pixels to generate sub-pel-unit pixel values may include interpolation filtering of integer-pel-unit reference pixel values including integer-pel-unit pixels adjacent to the sub-pel-unit interpolation location in a region supported by the interpolation filter.

An interpolation filter according to an exemplary embodiment may include filter coefficients for transforming integer-pel-unit reference pixels based on a plurality of basis functions, and for inversely transforming a plurality of coefficients generated as a transformation result.

The interpolation filter may be a one-dimensional filter or a two-dimensional filter. If the selected interpolation filter is a one-dimensional filter, the interpolator 14 may sequentially perform filtering by using one-dimensional interpolation filters in two or more directions, thereby generating a current sub-pel-unit pixel value.

A smoothing interpolation filter according to an exemplary embodiment may have a smoothness determined based on a distance between an interpolation location and integer-pel-unit pixels.

An interpolation filter according to an exemplary embodiment may include different filter coefficients based on a sub-pel-unit interpolation location and a smoothness. Hereinafter, an interpolation filter determined in consideration of a sub-pel-unit interpolation location and a smoothness is referred to as a smoothing interpolation filter.

A smoothing interpolation filter according to an exemplary embodiment may have a smoothness determined based on a distance between an interpolation location and integer-pel-unit pixels adjacent to the interpolation location.

Also, the smoothing interpolation filter may include filter coefficients for more strongly smoothing integer-pel-unit reference pixels away from the interpolation location.

In order to interpolate integer-pel-unit pixels in a spatial domain, the smoothing interpolation filter may be obtained by combining filter coefficients for performing transformation and inverse transformation by using a plurality of basis functions, and window function coefficients for performing low pass filtering.

A window function according to an exemplary embodiment may be symmetric with respect to an interpolation location. The smoothing interpolation filter obtained by combining filter coefficients for performing transformation and inverse transformation and window function coefficients for performing low pass filtering may include filter coefficients for giving a large weight to a integer-pel-unit reference pixel close to the interpolation location and giving a small weight to a integer-pel-unit reference pixel away from the interpolation location.

The smoothing interpolation filter may include filter coefficients for smoothing integer-pel-unit reference pixels, transforming the smoothed integer-pel-unit reference pixels by using a plurality of basis functions, and inversely transforming a plurality of coefficients generated as a transformation result.

The smoothing interpolation filter is an interpolation filter in a spatial domain, and may include filter coefficients obtained by combining an interpolation filter for performing transformation and inverse transformation, and a smoothing parameter. The smoothing parameter may control at least one of a smoothing speed and a smoothing range.

The smoothing interpolation filter may include filter coefficients based on a spline function. That is, a basis function of transformation and inverse transformation for determining interpolation filter coefficients may be a spline function. In order to obtain a smoother interpolation result, the smoothing interpolation filter may include filter coefficients determined by using a spline function.

According to an exemplary embodiment, a smoothing interpolation filter based on a spline function may include filter coefficients for most strongly smoothing boundary integer-pel-unit reference pixels based on a boundary condition of the spline function.

According to another exemplary embodiment, if a basis function of transformation and inverse transformation is a polynomial function, a smoothing interpolation filter may include filter coefficients for maximizing a low-frequency response of an interpolation filter based on the polynomial function.

A smoothing interpolation filter according to an exemplary embodiment may include different filter coefficients based on a filter length as well as a sub-pel-unit interpolation location and a smoothness.

Also, the smoothing interpolation filter may include different filter coefficients based on a scaling factor of an interpolation result as well as a sub-pel-unit interpolation location, a smoothness, and a filter length. The filter selector 12 may select a smoothing interpolation filter including filter coefficients scaled to integers. The interpolator 14 normalizes pixel values generated by using the smoothing interpolation filter selected by the filter selector 12.

Also, the filter selector 12 may differently select an interpolation filter based on pixel characteristics. The interpolator 14 may generate sub-pel-unit pixel values by using the interpolation filter differently selected based on pixel characteristics.

The interpolation filter selectable by the filter selector 12 may include a smoothing interpolation filter and a general interpolation filter that does not consider smoothing. Thus, based on image characteristics, the filter selector 12 may select a general interpolation filter that does not consider smoothing at all.

For example, according to another exemplary embodiment, the image interpolation apparatus 10 may perform image interpolation by using different interpolation filters according to color components.

According to another exemplary embodiment, the filter selector 12 may differently select an interpolation filter based on the sub-pel-unit interpolation location and a color component of a current pixel. According to another exemplary embodiment, the interpolator 14 may interpolate integer-pel-unit pixels by using the selected interpolation filter, thereby generating at least one sub-pel-unit pixel value.

For example, the filter selector 12 may differently determine an interpolation filter for a luma component and an interpolation filter for a chroma component.

In order to interpolate a chroma pixel, the filter selector 12 may select a smoothing interpolation filter having a stronger smoothness than that of an interpolation filter for a luma pixel.

For example, in order to interpolate a chroma pixel, an interpolation filter including filter coefficients determined based on a spline function or an interpolation filter including filter coefficients determined based on a polynomial function may be selected. The filter coefficients determined based on a spline function may most strongly smooth boundary integer-pel-unit pixels based on a boundary condition of the spline function. The interpolation filter determined based on a polynomial function may include filter coefficients for maximizing a low-frequency response.

Also, in order to interpolate a chroma pixel, an interpolation filter including filter coefficients determined based on a smoothing parameter having a stronger smoothness than that of an interpolation filter for a luma pixel, or an interpolation filter including filter coefficients combined with a window function for removing more high-frequency components than an interpolation filter for a luma pixel may be selected.

In order to obtain a smooth interpolation result of a chroma component, a smoothing interpolation filter obtained by combining filter coefficients for performing transformation and inverse transformation based on a plurality of basis functions, and window function coefficients for performing low pass filtering may be selected.

Image interpolation is used to transform a low-quality image into a high-quality image, to transform an interlaced image into a progressive image, or to up-sample a low-quality image into a high-quality image. Also, when a video encoding apparatus encodes an image, a motion estimator and compensator may perform inter prediction by using an interpolated reference frame. The accuracy of inter prediction may be increased by interpolating a reference frame to generate a high-quality image, and performing motion estimation and compensation based on the high-quality image. Similarly, when an image decoding apparatus decodes an image, a motion compensator may perform motion compensation by using an interpolated reference frame, thereby increasing the accuracy of inter prediction.

Also, the smoothing interpolation filter used by the image interpolation apparatus 10 may obtain a smooth interpolation result by reducing high-frequency components in an interpolation result using an interpolation filter. Since the high-frequency components reduce the efficiency of image compression, the efficiency of image encoding and decoding may also be improved by performing smoothness-adjustable image interpolation.

Figure 2:
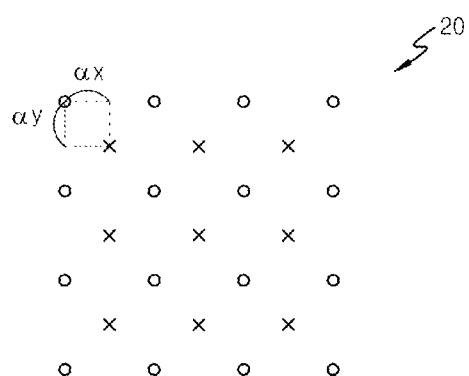
FIG. 2 is a diagram for describing a relationship between an integer-pel unit and a sub-pel unit.

FIG. 2 is a diagram for describing a relationship between an integer-pel unit and a sub-pel unit.

Referring to FIG. 2, the image interpolation apparatus 10 generates pixel values of locations 'X' by interpolating integer-pel-unit pixel values of locations 'O' of a predetermined block 20 in a spatial domain. The pixel values of the locations 'X' are sub-pel-unit pixel values of interpolation locations determined by αx and αy. Although FIG. 2 illustrates that the predetermined block 20 is a 4×4 block, it will be easily understood by one of ordinary skill in the art that the block size is not limited to 4×4 and may be greater or smaller than 4×4.

In video processing, a motion vector is used to perform motion compensation and prediction on a current image. Based on prediction encoding, a previously decoded image is referred to so as to predict a current image, and a motion vector indicates a predetermined point of a reference image. Therefore, a motion vector indicates an integer-pel-unit pixel of a reference image.

However, a pixel to be referred to by a current image may be located between integer-pel-unit pixels of a reference image. Such a location is referred to as a sub-pel-unit location. Since a pixel does not exist at a sub-pel-unit location, a sub-pel-unit pixel value is merely predicted by using integer-pel-unit pixel values. In other words, a sub-pel-unit pixel value is estimated by interpolating integer-pel-unit pixels.

A method of interpolating integer-pel-unit pixels will now be described in detail with reference to FIGS. 3, and 4A through 4C.

Figure 3:
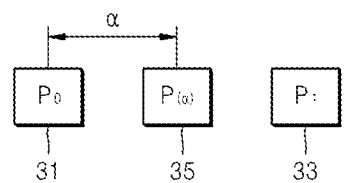
FIG. 3 is a diagram illustrating adjacent integer-pel-unit pixels to be referred to so as to determine a sub-pel-unit pixel value, according to an exemplary embodiment.

FIG. 3 is a diagram illustrating adjacent integer-pel-unit pixels to be referred to so as to determine a sub-pel-unit pixel value, according to an exemplary embodiment.

Referring to FIG. 3, the image interpolation apparatus 10 generates a sub-pel-unit pixel value 35 of an interpolation location by interpolating integer-pel-unit pixel values 31 and 33 in a spatial domain. The interpolation location is determined by a.

Figure 4A:
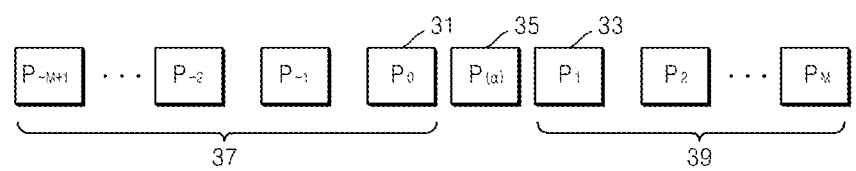
FIGS. 4A through 4C are diagrams illustrating examples of integer-pel-unit pixels to be referred to so as to determine a sub-pel-unit pixel value, according to an exemplary embodiment.
Figure 4B:
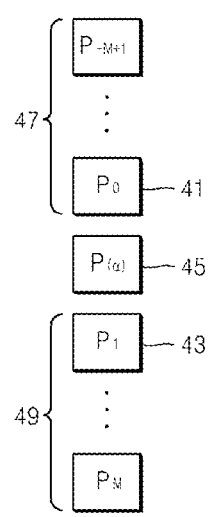
Figure 4C:
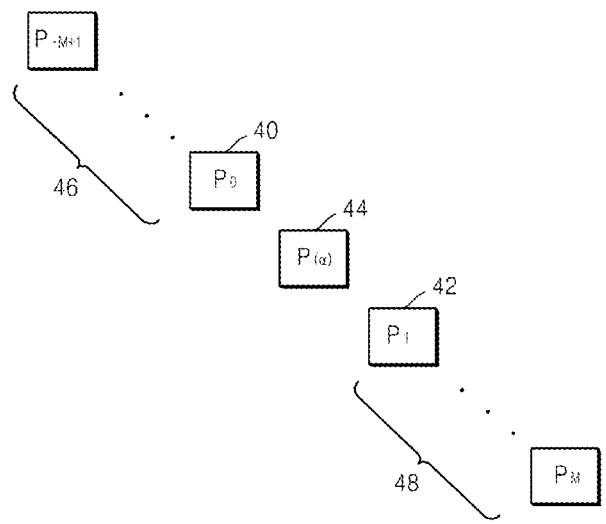

FIGS. 4A through 4C are diagrams illustrating examples of integer-pel-unit pixels to be referred to so as to determine a sub-pel-unit pixel value, according to an exemplary embodiment.

Referring to FIG. 4A, in order to generate the sub-pel-unit pixel value 35 by interpolating the two integer-pel-unit pixel values 31 and 33, a plurality of adjacent integer-pel-unit pixels values 37 and 39 including the integer-pel-unit pixel values 31 and 33 are used. In other words, 0th and 1st pixels may be interpolated by performing one-dimensional interpolation filtering on 2M pixel values from an −(M−1)th pixel value to an Mth pixel value.

Also, although FIG. 4A illustrates that pixel values in a horizontal direction are interpolated, one-dimensional interpolation filtering may be performed by using pixel values in a vertical or diagonal direction.

Referring to FIG. 4B, a pixel value P(α) of an interpolation location α may be generated by interpolating pixels $P_0$ 41 and $P_1$ 43 that are adjacent to each other in a vertical direction. When FIGS. 4A and 4B are compared, their interpolation filtering methods are similar and the only difference therebetween is that pixel values 47 and 49 aligned in a vertical direction are interpolated in FIG. 4B while the pixel values 37 and 39 aligned in a horizontal direction are interpolated in FIG. 4A.

Referring to FIG. 4C, similarly, a pixel value 44 of the interpolation location α is generated by interpolating two adjacent pixel values 40 and 42. The only difference from FIG. 4A is that pixel values 46 and 48 aligned in a diagonal direction are used instead of the pixel values 37 and 39 aligned in a horizontal direction.

In addition to the directions shown in FIGS. 4A through 4C, one-dimensional interpolation filtering may be performed in various directions.

Interpolation filtering may be performed to interpolate integer-pel-unit pixels for generating a sub-pel-unit pixel value. The interpolation filtering may be represented by the following equation.

$$p(\alpha) = f(\alpha) \times p = \Sigma_{-M+1}^{M} f_m \cdot p_m$$

A pixel value p(x) is generated by performing interpolation based on a dot product of a vector p of 2M integer-pel-unit reference pixels $\{p_m\} = \{p_{-M+1}, p_{-M+2}, \ldots, p_0, p_1, \ldots, p_M\}$ and a vector f(x) of filter coefficients $\{f_m\} = \{f_{-M+1}, f_{-M+2}, \ldots, f_0, f_1, \ldots, f_M\}$. Since a filter coefficient f(α) varies based on the interpolation location α and a pixel value p(α) obtained by performing interpolation is determined based on the filter coefficient f(α), a selected interpolation filter, i.e., the determined filter coefficient f(x), greatly influences the performance of interpolation filtering.

Image interpolation using transformation and inverse transformation based on basis functions, and a method of determining an interpolation filter will now be described in detail.

An interpolation filter using transformation and inverse transformation initially transforms pixel values by using a plurality of basis functions having different frequency components. Transformation may include all types of transformation from pixel values in a spatial domain into coefficients in a transformation domain, and may be discrete cosine transformation (DCT). Integer-pel-unit pixel values are transformed by using a plurality of basis functions. A pixel value may be a luma pixel value or a chroma pixel value. Basis functions are not limited to particular basis functions and may include all basis functions for transforming pixel values in a spatial domain into pixel values in a transformation domain. For example, a basis function may be a cosine or sine function for performing DCT and inverse DCT (IDCT). Alternatively, various basis functions such as a spline function and a polynomial function may be used. Also, DCT may be modified DCT (MDCT) or MDCT with windowing.

The interpolation filter using transformation and inverse transformation shifts phases of the basis functions used to perform transformation and inversely transforms values of a plurality of coefficients generated by using the phase-shifted basis functions, i.e., values in a transformation domain. As an inverse transformation result, pixel values in a spatial domain are output and the output values may be pixel values of an interpolation location.

<Filter Coefficients Using Orthogonal Transformation and Inverse Transformation Based on Orthogonal Basis Functions>

A case when the interpolator 14 performs interpolation filtering using transformation and inverse transformation based on orthogonal basis functions will now be described in detail. Specifically, DCT is described as an example of the transformation.

For example, referring to FIG. 4A, in order to generate the sub-pel-unit pixel value 35 by interpolating the two integer-pel-unit pixel values 31 and 33, by using a plurality of adjacent integer-pel-unit pixels values 37 and 39 including the integer-pel-unit pixel values 31 and 33, 0th and 1st pixels may be interpolated by performing one-dimensional DCT on 2M pixel values from an −(M−1)th pixel value to an Mth pixel value, and performing one-dimensional IDCT based on phase-shifted basis functions.

The interpolator 14 initially performs one-dimensional DCT on integer-pel-unit pixel values. One-dimensional DCT may be performed as represented in Equation 1.

$$C_k = \frac{1}{M} \sum_{l=-M+1}^{M} p(l) \cos\left( \frac{(2l - 1 + 2M)k\pi}{4M} \right), \quad \text{[Equation 1]}$$

$$0 \leq k \leq 2M - 1$$

where p(l) represents the pixel values 37 and 39 from an −(M−1)th pixel value to an Mth pixel value, and Ck represents a plurality of coefficients in a frequency domain, which are generated by performing one-dimensional DCT on the pixel values 37 and 39. In this case, k is a positive integer that satisfies the above condition of Equation 1.

After one-dimensional DCT is performed on the pixel values 37 and 39 by using Equation 1, the interpolator 14 performs inverse transformation on the coefficients as represented in Equation 2.

$$P(\alpha) = \frac{C_0}{2} + \sum_{k=1}^{2M-1} C_k \cos\left(\frac{(2\alpha - 1 + 2M)k\pi}{4M}\right) \quad \text{[Equation 2]}$$

where α represents an interpolation location between two pixel values as illustrated in FIG. 13, and may have various fractional values such as ½, ¼, ¾, ⅛, ⅜, ⅝, ⅞, 1/16, etc. The fractional value is not limited to a particular value, and a may be a real value instead of a fractional value. P(α) represents the sub-pel-unit pixel value 35 of the interpolation location α, which is generated as a one-dimensional IDCT result.

When Equation 2 is compared to Equation 1, the phase of a cosine function that is a basis function used to perform IDCT is determined based on a fractional number α instead of an integer 1, and thus is different from the phase of a basis function used to perform one-dimensional DCT. In other words, the phase of each basis function used to perform inverse transformation, i.e., a cosine function, is shifted based on 2α. If the interpolator 14 performs IDCT based on the phase-shifted cosine functions according to Equation 2, the sub-pel-unit pixel value 35 of the interpolation location α, i.e., P(α), is generated.

DCT according to Equation 1 is expressed by a matrix equation represented in Equation 3.

$$C = D \times REF \quad \text{[Equation 3]}$$

Here, C is a 2M×1 matrix of the 2M coefficients described above in relation to Equation 1, and REF is a 2M×1 matrix of the integer-pel-unit pixel values, i.e., $P_{-(M-1)}, \ldots P_M$ pixel values, described above in relation to Equation 1. The number of integer-pel-unit pixel values used to perform interpolation, i.e., 2M, refers to the number of taps of a one-dimensional interpolation filter. D is a square matrix for performing one-dimensional DCT and may be defined as represented in Equation 4.

$$D_{kl} = \frac{1}{M} \cos\left(\frac{(2l - 1 + 2M)k\pi}{4M}\right), \quad \text{[Equation 4]}$$
$$0 \le k \le 2M - 1,$$
$$-(M-1) \le l \le M$$

where k and l are integers that satisfy the above conditions, and $D_{kl}$ refers to a row k and a column l of the square matrix D for performing DCT in Equation 3. M is the same as that of Equation 3.

IDCT using a plurality of phase-shifted basis functions according to Equation 2 is expressed by a matrix equation represented in Equation 5.

$$P(\alpha) = W(\alpha) \times C \quad \text{[Equation 5]}$$

Here, P(α) is the same as that of Equation 2, and W(α) is a 1×2M matrix for performing one-dimensional IDCT by using a plurality of phase-shifted basis functions and may be defined as represented in Equation 6.

$$W_0(\alpha) = \frac{1}{2}, \quad \text{[Equation 6]}$$
$$W_k(\alpha) = \cos\left(\frac{(2\alpha - 1 + 2M)k\pi}{4M}\right),$$
$$1 \le k \le 2M - 1$$

where k is an integer that satisfies the above condition, and $W_k(\alpha)$ refers to a column k of the matrix W(α) described above in relation to Equation 5. A filter F(α) for performing one-dimensional DCT and one-dimensional IDCT using a plurality of phase-shifted basis functions according to Equations 3 and 5 may be defined as represented in Equation 7.

$$P(\alpha) = F(\alpha) \times REF, \quad \text{[Equation 7]}$$
$$F_l(\alpha) = \sum_{k=0}^{2M-1} W_k(\alpha) D_{kl},$$
$$0 \le k \le 2M - 1,$$
$$-(M-1) \le l \le M$$

where k and l are integers that satisfy the above conditions, $F_l(\alpha)$ refers to a column l of F(α), and W(α) and D are the same as those of Equation 3.

In order to generate more strongly smoothed sub-pel-unit pixel values, the interpolator 14 may change an interpolation filter used to perform transformation and inverse transformation based on a basis function.

A case when a window function is used, a case when a plurality of smoothing parameters are used, a case when a spline function is used as a basis function, and a case when a polynomial function is used as a basis function to determine various smoothing interpolation filters will now be sequentially described in detail.

<Smoothing Interpolation Filter Using Window Function>

A method of smoothing interpolation filter coefficients by using a window function will now be described in detail.

A window function may include a hamming window function, a cosine window function, an exponential window function, a hanning window function, a Blackman window function, and a triangle window function. Although cases when interpolation filters based on transformation and inverse transformation are smoothed by using certain window functions will be described below for convenience of explanation, it will be easily understood by one of ordinary skill in the art that, in addition to the described window functions, other window functions having similar frequency responses may also be used.

Window coefficients based on a hamming window function satisfy Equation 24.

$$w(n) = 0.54 - 0.46 \cos\left(\frac{2\pi n}{N}\right), \quad 0 \le n \le N \quad \text{[Equation 8]}$$

In various window functions including the hamming window function, an input n is symmetric with reference to N/2 and a frequency response is similar to that of a low pass filter. From among inputs of a window function, only an input covered by a window formed by the window function may be output. A window size N may be set as a positive integer greater than the length of an original interpolation filter. For example, in order to apply a window function to an interpolation filter for generating a sub-pel-unit pixel such as a ½ or ¼ pixel, the central location of the window function may be moved by a ½ or ¼ pixel. That is, since the central location of the window function is moved to an interpolation location, the window function may be symmetric with respect to the interpolation location.

For example, Equations 9 and 10 respectively show window coefficients of hamming window functions for ½-pel-unit and ¼-pel-unit interpolation filters, respectively.

$$w_{\frac{1}{2}}(n) = 0.54 - 0.46 \cos\frac{2\pi}{N}\left(\frac{N-1}{2} + n\right)$$ [Equation 9]

$$w_{\frac{1}{4}}(n) = 0.54 - 0.46 \cos\frac{2\pi}{N}\left(\frac{2N-1}{4} + n\right)$$ [Equation 10]

Equation 11 sequentially shows window coefficients of a hamming window function, a cosine window function, and an exponential window function as window functions for interpolation filters, which are generalized based on a sub-pel-unit interpolation location α.

$$w_\alpha(n) = 0.54 - 0.46 \cos\left(\frac{2\pi}{N}\left(\frac{N}{2} - \alpha + n\right)\right),$$ [Equation 11]

$$w_\alpha(n) = \cos\left(\pi\frac{n-\alpha}{N}\right),$$

$$w_\alpha = \exp - \beta(\alpha - n)^2$$

By combining the window coefficients according to Equation 11 with an original interpolation filter $f_k(\alpha)$, smoothing interpolation filter coefficients may be determined according to Equation 12.

$$\tilde{f}_k = f_k(\alpha) w_\alpha(k),$$

$$k = -M+1, \ldots, M$$ [Equation 12]

Since a smoothing interpolation filter is determined by using a window function, a weight of an interpolation filter coefficient may be adjusted based on the distance between an integer-pel-unit reference pixel and an interpolation location. For example, a smoothing interpolation filter may be determined in such a way that, by a window function, from among filter coefficients of an interpolation filter, a filter coefficient for an integer-pel-unit reference pixel located far from an interpolation location is greatly changed and a filter coefficient for an integer-pel-unit reference pixel located close to the interpolation location is not greatly changed.

Also, if a smoothing interpolation filter is determined by using a window function, interpolation filtering may be performed after integer-pel-unit reference pixels are smoothed. Input integer-pel-unit reference pixels Ref={$p_{-M+1}$, $p_{-M+2}$, ..., $p_0$, $p_1$, ..., $p_M$} may include noise or may be damaged due to an error such as a quantization error. As such, if integer-pel-unit reference pixels are smoothed before interpolation filtering is performed, the image interpolation apparatus 10 may improve an interpolation effect.

<Smoothing Interpolation Filter Using Two Parameters>

A smoothing interpolation filter may determine the smoothness of filter coefficients based on two parameters. Sub-pel-unit smoothing interpolation filter coefficients obtained by combining a smoothing matrix S and interpolation filter coefficients based on transformation and inverse transformation satisfy Equation 13.

$$\tilde{f}(\alpha) = f(\alpha)^T S$$ [Equation 13]

Equation 14 shows an example of the smoothing matrix S.

$$s_{i,j} = 0;$$

$$\{s_{i,i} = 1 - \sigma_i; s_{i,i+1} = \sigma_i\}; i = -M+1$$

$$\{s_{i,i} = 1 - 2\sigma_i; s_{i,i\pm 1} = \sigma_i\}; -M = 1 \leq i \leq M$$

$$\{s_{i,i} = 1 - \sigma_i; s_{i,i-1} = \sigma_i\}; i = M$$ [Equation 14]

The smoothing matrix S according to Equation 14 is a 3-diagonal matrix. In other words, from among components of the smoothing matrix S, components other than components on one central diagonal line and two diagonal lines corresponding to each other and adjacent to the central diagonal line are all 0.

In the smoothing matrix S, a smoothness σi may be determined regardless of the distance (i-α) from integer-pel-unit pixels to be interpolated. In this case, smoothing based on the smoothing matrix S may be referred to as uniform smoothing.

Also, in the smoothing matrix S, the smoothness σi may vary based on an index I of an integer-pel-unit pixel location. In this case, smoothing based on the smoothing matrix S may be referred to as non-uniform smoothing. For example, the smoothness σi may satisfy Equation 15.

$$\sigma_i = \beta(i-\alpha)^l$$ [Equation 13]

A positive index 1 may increase a smoothing effect if the distance between an interpolation location and an integer-pel-unit reference pixel is large. Accordingly, the positive index 1 may control the speed of smoothing based on the distance between an interpolation location and an integer-pel-unit reference pixel. A smoothing parameter β may control the range of smoothing around an interpolation location.

If the smoothing parameter β is less than 0, the smoothing matrix S according to Equation 13 may be changed to a sharpening filter. Accordingly, if the smoothing matrix S that is less than 0 is combined with an interpolation filter using transformation and inverse transformation, a filter for amplifying high-frequency components may be generated.

In order to perform sub-pel-unit prediction, the image interpolation apparatus 10 may use smoothing interpolation filter coefficient data previously stored in memory.

Figure 5:
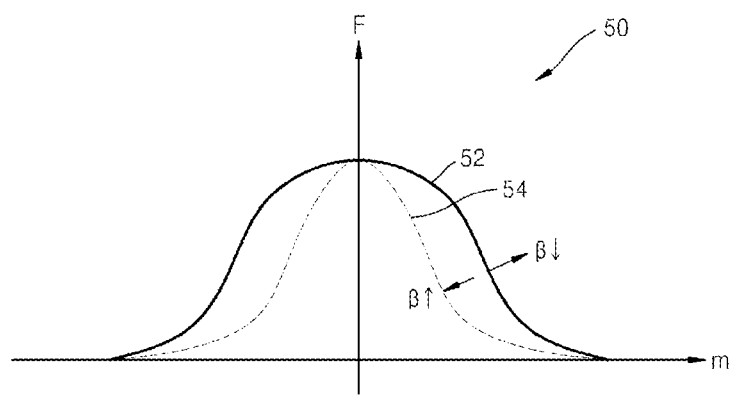
FIG. 5 is a graph of a smoothing parameter of a smoothing interpolation filter, according to an exemplary embodiment.

FIG. 5 is a graph 50 of a smoothing factor based on a smoothing parameter of a smoothing interpolation filter, according to an exemplary embodiment.

First and second curves 52 and 54 show a smoothing factor for smoothing an interpolation filter based on discrete transformation. If m is large, that is, if the distance from integer-pel-unit pixels to be interpolated is increased, the smoothing factor is close to 0.

Here, in comparison to the second curve 54 in a case when the smoothing parameter β is large, the first curve 52 in a case when the smoothing parameter β is small has a relatively large width of the smoothing factor. In other words, if the smoothing parameter β of the smoothing interpolation filter is large, low-frequency components may be mainly filtered and thus relatively strongly smoothed sub-pel-unit pixel values may be generated. If the smoothing parameter β of the smoothing interpolation filter is relatively small, relatively high-frequency components may remain and be interpolated and thus sub-pel-unit pixel values may be generated.

In order to determine filter coefficients of a smoothing interpolation filter, the image interpolation apparatus 10 may use a spline function or a polynomial function as a basis function as well as an orthogonal basis function.

<Smoothing Interpolation Filter Based on Spline Function>

The image interpolation apparatus 10 may determine filter coefficients of a smoothing interpolation filter based on a spline function.

Also, in order to smooth an interpolation result, the image interpolation apparatus 10 may use a spline function having a boundary condition. In more detail, for example, if polynomial spline interpolation having a variable ρ is used to form an interpolation filter using M integer-pel-unit pixels $p_m$ (M is an integer equal to or greater than 2), in order to allow the variable ρ has a maximum smoothness in a range of 3≤ρ≤M+1 and to allow a spline value, i.e., an interpolation result value to be infinitely smooth at an (−M+2)th pixel and an (M−1)th pixel, (ρ−1) additional conditions may be set. These additional conditions are referred to as not-a-knot boundary conditions or de Boor boundary conditions.

An interpolation result using interpolation filter coefficients based on a spline function may be represented as a weighted sum calculated by using Equation 16.

$$S(x) = \sum_{-M+1}^{M} p_m f_m(x) \qquad \text{[Equation 16]}$$

Input pixels $p_m$ are integer-pel-unit reference pixels, and a set $\{p_m\}$ of input pixels in which the range of m is [−M+1, M] (i.e., −M+1≤m≤M) are input. A spline function S(x) corresponds to pixel values generated as an interpolation result. $f_m(x)$ is a cardinal spline interpolant and corresponds to filter coefficients based on a cardinal spline function. $f_m(x)$ may be cardinal spline function values having the same boundary condition and having values only at integer-pel-unit reference pixel locations (i.e., −M+1≤m≤M, m is an integer).

The filter coefficient $f_m(x)$ may be determined by using Equation 17.

$$f_m(x) = \delta_m^{-M+1+k}(1-z) + \delta_m^{-M+1+k+1}z + \sigma_m^k((1-z)^3+z-1)/6 + \sigma_m^{k+1}(z^3-z)/6,$$

$$z = x+M-1-k \qquad \text{[Equation 17]}$$

When k is an integer in a range of 0≤k≤2M−2, the spline filter coefficient $f_m(x)$ may be determined at every integer m in a range of [−M+1+k, −M+k+2], i.e., from (−M+1+k) to (−M+k+2). In Equation 17, a coefficient $\sigma_m^k$ may be determined based on Equation 18.

$$-\sigma_m^0 + 2\sigma_m^1 - \sigma_m^2 = 0,$$

$$\sigma_m^{k-1} + 4\sigma_m^k + \sigma_m^{k+1} = 6(\delta_m^{k-1} - 2\delta_m^k + \delta_m^{k+1}), 1 \leq k \leq 2M-3,$$

$$-\sigma_m^{2M-3} + 2\sigma_m^{2M-2} - \sigma_m^{2M-1} = 0, \qquad \text{[Equation 18]}$$

For sub-pel-unit interpolation, a finite impulse response (FIR) filter including spline filter coefficients $f_m(\alpha)$ according to an interpolation location α may be previously calculated and stored, and a sub-pel-unit pixel value at an interpolation location α between a 0th pixel and a first pixel may be generated by performing interpolation filtering using the FIR filter including the spline filter coefficients $f_m(\alpha)$ on the integer-pel-unit reference pixel $p_m$.

Figure 6:
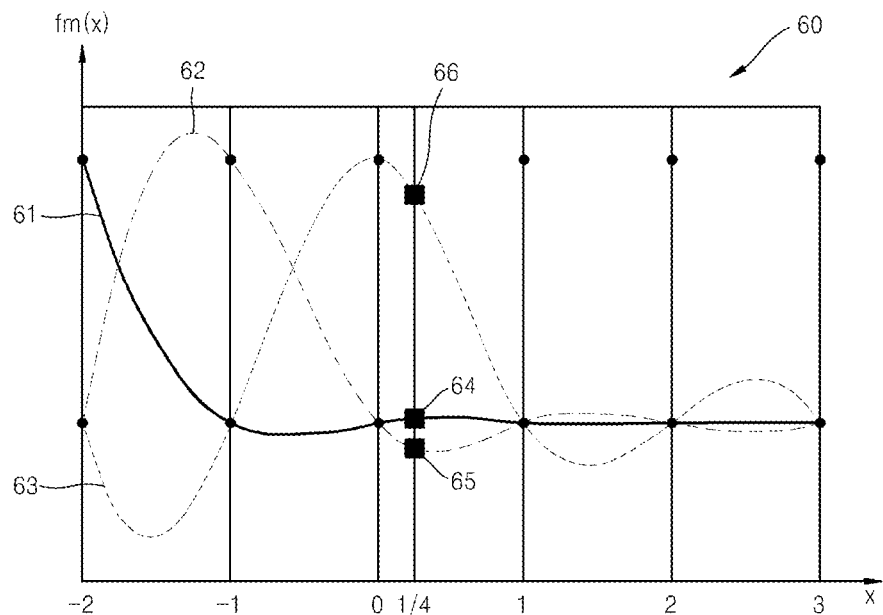
FIG. 6 is a graph of a spline function usable by a smoothing interpolation filter, according to an exemplary embodiment.

FIG. 6 is a graph of a spline function 60 usable by a smoothing interpolation filter, according to an exemplary embodiment.

Referring to FIG. 6, based on a spline function having a variable ρ of 3, three spline interpolant curves $f_{-2}(x)$ 61, $f_{-1}(x)$ 62, and $f_0(x)$ 63 for 2M=6, i.e., a 6-tap interpolation filter are illustrated. For example, interpolation filter coefficients for generating sub-pel-unit pixel values that satisfy α=¼ may be determined as $f_{-2}(¼)$ 64, $f_{-1}(¼)$ 65, and $f_0(¼)$ 66 on the spline interpolant curves $f_{-2}(x)$ 61, $f_{-1}(x)$ 62, and $f_0(x)$ 63.

<Smoothing Interpolation Filter Based on Polynomial Function>

The image interpolation apparatus 10 may determine filter coefficients of a smoothing interpolation filter based on a polynomial function.

A polynomial interpolation function including interpolation filter coefficients $\{f_k\}$ based on a polynomial function may be represented based on a polynomial function as a basis function by using Equation 19. The integer k is defined within a range of −M+1≤k≤M.

$$\sum_{-M+1}^{M} f_k(\alpha) e^{i\omega k}, e^{i\omega \alpha} \qquad \text{[Equation 19]}$$

Also, in order to smooth an interpolation result, the image interpolation apparatus 10 may determine filter coefficients optimized to a low-frequency band from among interpolation filter coefficients $\{f_k\}$ based on a polynomial function. For example, if a frequency ω is 0, filter coefficients $\{f_k\}$ determined when a function value of a polynomial interpolation function and function values of derivatives of the polynomial interpolation function are the same, may be determined as interpolation filter coefficients optimized to a low-frequency band. As such, as represented in Equation 20, as a function for the integer k, 2M linear functions for 2M filter coefficients $\{f_k\}$ (2M is an unknown) may be obtained.

$$\sum_{-M+1}^{M} f_k(\alpha) k^m = \alpha^m \qquad \text{[Equation 20]}$$

Solutions of the linear functions of Equation 20 may be calculated by using a Newton polynomial function. Equation 21 represents 2M filter coefficients $\{f_k\}$ calculated as solutions of the linear functions of Equation 20.

$$f_k(\alpha) = \frac{\prod\limits_{m=-M+1, m \neq k}^{M} (m - \alpha)}{\prod\limits_{m=-M+1, m \neq k}^{M} (m - k)} \qquad \text{[Equation 21]}$$

An interpolation filter including the filter coefficients $\{f_k\}$ determined based on the Newton polynomial function of Equations 20 and 21 has a maximum response at a low-frequency band, a more strongly smoothed interpolation result may be obtained by using pixel values using this interpolation filter. Accordingly, an interpolation filter including filter coefficients determined based on a polynomial function as a basis function may be selected as a smoothing interpolation filter.

As such, the image interpolation apparatus 10 may generate more strongly smoothed interpolation pixels by selecting a smoothing interpolation filter including interpolation filter coefficients based on a polynomial function. In particular, since chroma pixels have strong high-frequency components, in order to generate sub-pel-unit pixel values of chroma integer-pel-unit pixels, a smoothing interpolation filter including interpolation filter coefficients based on a polynomial function may be used.

<Interpolation Filter Coefficients for Scaled Interpolation>

Various smoothing interpolation filter generation methods according to exemplary embodiments are based on an arithmetic expression for generating a floating point number instead of an integer, and absolute values of filter coefficients are usually not greater than 1. Specifically, a calculation result of a real number instead of an integer may be generated by a sub-pel-unit interpolation location $\alpha$.

The efficiency of integer-based calculation is greater than that of floating-point-based calculation. As such, the image interpolation apparatus 10 may improve the calculation efficiency of interpolation filtering by scaling filter coefficients into integers by using a scaling factor. Also, since a bit depth of pixel values is increased, the accuracy of interpolation filtering may also be improved.

The image interpolation apparatus 10 may multiply filter coefficients $f_m(\alpha)$ by a predetermined value, and may perform image interpolation by using large filter coefficients $F_m(\alpha)$. For example, the filter coefficients $F_m(\alpha)$ may be scaled from the filter coefficients $f_m(\alpha)$ as represented in Equation 22.

$$F_m(\alpha) = \text{int}(f_m(\alpha) \cdot 2^n) \quad \text{[Equation 22]}$$

For efficiency of calculation, the scaling factor may be in the form of $2^n$. n may be 0 or a positive integer. An interpolation filtering result using filter coefficients scaled by $2^n$ may have a bit depth scaled by n bits in comparison to a result obtained by using original filter coefficients.

Integer calculation interpolation filtering using the scaled filter coefficients $F_m(\alpha)$ may satisfy Equation 23. In other words, after interpolation filtering is performed by using the scaled filter coefficients $F_m(\alpha)$, the scaled bit depth has to be reconstructed to an original bit depth.

$$p(\alpha) = \left( \sum_{-M+1}^{M} F_m(\alpha) \cdot p_m + \text{offset} \right) \gg n \quad \text{[Equation 23]}$$

In this case, an offset may be $2^{n-1}$.

In other words, since an scaled filtering result using a scaled smoothing interpolation filter has to be reduced by a scaling factor, i.e., $2^n$, so as to be reconstructed to original bits, a bit depth of the scaled filtering result may be reduced by n bits.

If two-step interpolation filtering is performed by performing one-dimensional interpolation filtering in a horizontal direction and performing one-dimensional interpolation filtering in a vertical direction, a reduction may be made by a total of 2n bits. Accordingly, if a first one-dimensional interpolation filter is scaled by n1 bits and a second one-dimensional interpolation filter is scaled by n2 bits, after two-step interpolation filtering is performed by using the first and second one-dimensional interpolation filters, a reduction may be made by a sum of n1 and n2, i.e., 2n bits. The first one-dimensional interpolation filter may be an interpolation filter that is not scaled.

Since a sum of the smoothing filter coefficients $f_m(\alpha)$ is 1, $$\Sigma_{-M+1}^{M} F_m(\alpha) = 1 \quad \text{[Equation 10]}$$

where a condition for normalizing the scaled smoothing filter coefficients $F_m(\alpha)$ of the scaled interpolation filter satisfies Equation 25.

$$\Sigma_{-M+1}^{M} F_m(\alpha) = 2^n \quad \text{[Equation 25]}$$

However, the normalization condition according to Equation 25 may cause a rounding error. The image interpolation apparatus 10 may round off the scaled filter coefficients $F_m(\alpha)$ based on the normalization condition according to Equation 19. For normalization, some of the scaled filter coefficients $F_m(\alpha)$ may be adjusted within a predetermined range of original values. For example, some of the scaled filter coefficients $F_m(\alpha)$ may be adjusted within a range of $\pm 1$ in order to correct a rounding error.

Various smoothing interpolation filters and filter coefficients are described above. Specifically, as a function for determining filter coefficients of a smoothing interpolation filter, a window function, a spline function, a polynomial function, etc. may be used. For a smoothing interpolation filter, a frequency response of a function may vary based on a frequency but a filter gain of the frequency response of the function may be close to 1. Accordingly, the image interpolation apparatus 10 may determine filter coefficients by using a function having a filter gain of which a frequency response is closest to 1 even when a frequency varies, and may select a smoothing interpolation filter including the filter coefficients.

Figure 7:
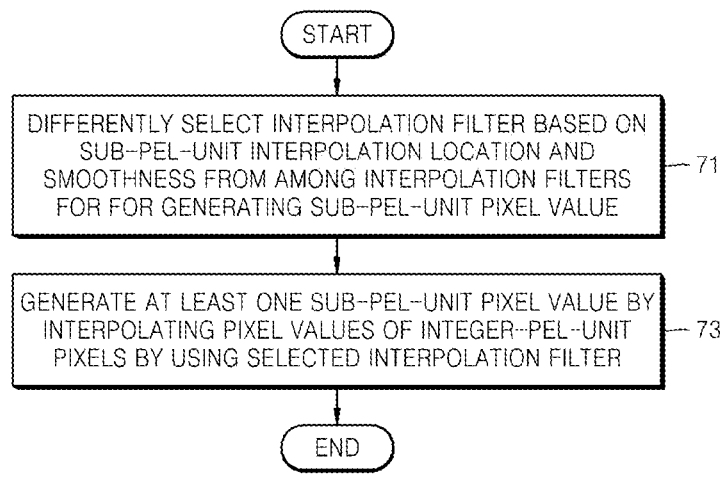
FIG. 7 is a flowchart of an image interpolation method according to an exemplary embodiment.

FIG. 7 is a flowchart of an image interpolation method according to an exemplary embodiment.

In operation 71, an interpolation filter is differently selected based on a sub-pel-unit interpolation location and a smoothness from among interpolation filters for generating at least one sub-pel-unit pixel value located between integer-pel-unit pixels of a picture. A smoothness of the interpolation filter may be determined based on a distance between an interpolation location and integer-pel-units.

An interpolation filter according to an exemplary embodiment may be a filter including filter coefficients for performing transformation and inverse transformation based on a plurality of basis functions. A smoothing interpolation filter according to an embodiment may include at least one of an interpolation filter combined with a window function, an interpolation filter based on a plurality of smoothing parameters, an interpolation filter based on a smoothing parameter, a spline interpolation filter, and a polynomial function interpolation filter.

In order to perform filtering by using a smoothing interpolation filter, filter coefficients may be determined to more strongly smooth integer-pel-unit reference pixels away from an interpolation location.

In operation 73, at least one sub-pel-unit pixel value is generated by interpolating pixel values of the integer-pel-unit pixels by using the interpolation filter selected in operation 71.

From among interpolation filters, if an interpolation filter including filter coefficients scaled to integers is selected, pixel values generated by using the interpolation filter may be normalized based on a scaling factor.

According to an exemplary embodiment, an interpolation filter may be differently selected based on characteristics of pixels to be interpolated, and sub-pel-unit pixel values may be generated by using the selected interpolation filter.

Various examples of filter coefficients of an interpolation filter determined in consideration of a sub-pel-unit interpolation location and a smoothness will now be described with reference to FIGS. 8A through 8C, 9A through 9C, 10, 11, and 12A through 12C.

FIGS. 8A through 8C are tables showing filter coefficients of 12-tap interpolation filters determined based on a smoothing parameter and an interpolation location, according to exemplary embodiments.

Referring to FIGS. 8A through 8C, from among the above-described interpolation filters based orthogonal transformation, in order to perform orthogonal transformation and inverse transformation after smoothing the integer-pel-unit reference pixels as described above in relation to FIG. 5, filter coefficients of a smoothing interpolation filter obtained by combining a smoothing matrix and an interpolation filter based on an orthogonal transformation are shown.

FIGS. 8A through 8C show various interpolation filters including different filter coefficients as a smoothing parameter β varies as 0, 0.002, 0.004, 0.006, 0.008, 0.010, 0.012, 0.014, 0.016, 0.018, and 0.020, and an interpolation location α varies as ⅛, ¼, ⅜, ½, ⅝, ¾, and ⅞.

For example, in the table of FIG. 8A, if the smoothing parameter β is 0.002 and the interpolation location α is ⅛, a filter including filter coefficients $\{f_m\}$, e.g., $\{f_{-11}, f_{-10}, f_{-9}, f_{-8}, f_{-7}, f_{-6}, f_{-5}, f_{-4}, f_{-3}, f_{-2}, f_{-1}, f_0, f_1, f_2, f_3, f_4, f_5, f_6, f_7, f_8, f_9, f_{10}, f_{11}, f_{12}\}$, determined as {−1, 4, −7, 12, −24, 246, 37, −16, 9, −5, 3, −1} may be selected as an interpolation filter.

FIGS. 9A through 9C are tables showing filter coefficients of 6-tap interpolation filters determined based on a smoothing parameter and an interpolation location, according to exemplary embodiments.

Although the filter coefficients of FIGS. 8A through 8C are 12 filter coefficients of a 12-tap interpolation filter from among smoothing interpolation filters obtained by combining a smoothing matrix and an orthogonal transformation interpolation filter, FIGS. 9A through 9C show 6 filter coefficients of a 6-tap interpolation filter. In FIGS. 8A through 8C, and 9A through 9C, various smoothing interpolation filters including different filter coefficients based on the smoothing parameter β and the interpolation location α may be shown.

The filter coefficients shown in FIGS. 8A through 8C, and 9A through 9C are coefficients scaled at a scaling factor of 256 ($=2^8$) based on scaled interpolation filtering and then rounded off.

In FIGS. 8A through 8C and 9A through 9C, when the interpolation location α is constant and the smoothing parameter β is increased, a filter coefficient $f_m$ may be relatively small.

Also, when the smoothing parameter β is constant and the interpolation location α is away from ½, if m of the filter coefficient $f_m$ is away from m=0 toward m=−M+1 or m=M, the filter coefficient $f_m$ may be relatively small in comparison to f0. The filter coefficient $f_m$ near m=0 may be relatively large.

Accordingly, when the smoothing parameter β is increased, if the interpolation location α is away from ½, that is, close to an integer-pel-unit pixel, a sharper interpolation filter, i.e., a less smoothing interpolation filter, may be selected.

Since an interpolation filter according to an exemplary embodiment is a mirror-reflective symmetric filter, a filter coefficient $f_m(\alpha)$ of an interpolation location (1−α) may be determined by using the filter coefficient $f_m(\alpha)$ of the interpolation location α. For example, in FIG. 9A, from among the filter coefficients $\{f_m\}$ having the smoothing parameter β=0.002, filter coefficients $\{f_m(⅜)\}$ of the interpolation location α=⅜ and filter coefficients $\{f_m(⅝)\}$ of the interpolation location α=1−⅜=⅝ are compared as shown below.

$\{f_m(⅜)\}=\{11,-42,196,117,-35,10\}$, $\{f_m(⅝)\}=\{10,-35,117,196,-42,11\}$

That is, it is shown that the filter coefficients $\{f_m(⅜)\}$ when m=−2, −1, 0 are the same as filter coefficients $\{f_m(⅝)\}$ when m=3, 2, 1, and the filter coefficients $\{f_m(⅜)\}$ when m=3, 2, 1 are the same as filter coefficients $\{f_m(⅝)\}$ when m=−2, −1, 0. Accordingly, in tables of FIGS. 10 through 12C, although only interpolation filter coefficients $f_m(\alpha)$ in a case when the interpolation location is less than or equal to ½ are shown, it will be easily understood by one of ordinary skill in the art that the interpolation filter coefficients $f_m(\alpha)$ in a case when the interpolation location is greater than ½ may also be determined.

FIG. 10 is a table showing filter coefficients of 6-tap interpolation filters determined for chroma pixels based on a smoothing parameter and an interpolation location, according to an exemplary embodiment.

The image interpolation apparatus 10 may differently select an interpolation filter based on image characteristics. For example, if a smoothing interpolation filter obtained by combining a smoothing matrix and an orthogonal transformation interpolation filter is determined, a smoothing parameter may vary based on image characteristics.

For example, since chroma pixels are down-sampled based on a color format of 4:2:0, the chroma pixels have less low-frequency components in comparison to luma pixels. In this case, referring to FIG. 10, regardless of an interpolation filter for luma pixels, only an interpolation filter for chroma pixels may be additionally selected. Various filter coefficients of interpolation filters differently selected based on a color component will now be described with reference to FIG. 11.

FIG. 11 is a table showing filter coefficients of smoothing interpolation filters differently determined based on a color component and an image interpolation location, according to an exemplary embodiment.

Referring to FIG. 11, various smoothing interpolation filters including different filter coefficients as a number of filter taps 2M, an interpolation location α, and a color component L(luma)/C(chroma) vary. The filter coefficients of FIG. 11 are coefficients scaled at a scaling factor of 256 ($=2^8$) and rounded off. As described above, based on mirror-reflective characteristics of interpolation filter coefficients, only a case when the interpolation location α is less than or equal to ½ is shown.

Similarly to FIGS. 8A through 8C, 9A through 9C, and 10, a result of comparing filter coefficients for a chroma component and filter coefficients for a luma component is similar to a result of comparing filter coefficients in a case when a smoothing parameter β is large and filter coefficients in a case when the smoothing parameter β is small.

FIGS. 12A through 12C are tables showing filter coefficients of smoothing interpolation filters based on an image interpolation location and a scaling factor, according to exemplary embodiments.

FIGS. 12A through 12C show various modified examples of filter coefficients of smoothing interpolation filters, which are scaled, rounded off, and normalized as a scaling factor of $2^n$ varies as 512, 256, 128, and 64, and the number of filter taps of an interpolation filter and an interpolation location α vary.

Specifically, in FIG. 12C, interpolation filter coefficients for interpolating ⅛ pixel units may be useful to perform motion compensation on chroma pixels. However, since image quality of chroma pixels, which is visually recognized by people, is less critical in comparison to luma pixels, due to a relatively short filter tap, e.g., 4-tap, and a low bit depth, a smoothing interpolation filter having a scaling factor of $2^5$ may also be used.

The filter coefficients shown in FIGS. 8A through 8C, 9A through 9C, 10, 11, and 12A through 12C merely are parts of various examples, and it will be easily understood by one of ordinary skill in the art that filter coefficients of interpolation filters considering smoothing, according to exemplary embodiments, may be modified based on various factors including an interpolation location, a smoothing parameter, a window function, a spline function, a polynomial function, a scaling factor, and rounding off.

Video encoding and decoding using a smoothing interpolation filter, according to exemplary embodiments, are described below with reference to FIGS. 13A, 13B, 14A, 14B, and 15 through 27. Video encoding and decoding based on coding units having a tree structure, according to exemplary embodiments, are described below with reference to FIGS. 15 through 25. Video encoding and decoding methods using a smoothing interpolation filter, according to exemplary embodiments, are described below with reference to FIGS. 26 and 27.

When various operations are performed on image data, the image data may be split into data groups and the same operation may be performed on data of the same data group. In the following description, a data group formed according to a predetermined standard is referred to as a 'data unit', and an operation is performed on each 'data unit' by using data included in the data unit.

<Video Encoding and Decoding Using Smoothing Interpolation Filter>

FIG. 13A is a block diagram of a video encoding apparatus 100 using a smoothing interpolation filter, according to an exemplary embodiment.

Operations of an encoder 120 and an output unit 130 of the video encoding apparatus 100 may be cooperatively controlled by a video encoding processor, a CPU, and a graphic processor.

In order to encode a current picture of an input video, the video encoding apparatus 100 splits the current picture into data units having a predetermined size and encodes each data unit.

For example, the current picture includes pixels in a spatial domain. In order to encode spatially adjacent pixels of the current picture at the same time, the current picture may be split into pixel groups having a predetermined size in such a way that adjacent pixels within a predetermined range form one group. By performing a series of encoding operations on pixels of the split pixel groups, the current picture may be encoded.

Since initial data of a picture to be encoded are pixel values in the spatial domain, each pixel group may be used as a data unit to be encoded. Also, when transformation coefficients in a transformation domain are generated by performing transformation for video encoding on pixel values of the pixel group in the spatial domain, the transformation coefficients are included in coefficient groups having the same size as the pixel groups in the spatial domain. Accordingly, a coefficient group of the transformation coefficients in the transformation domain may also be used as a data unit for encoding a picture.

Accordingly, in the spatial domain and the transformation domain, a data group having a predetermined size may be used as a data unit to be encoded. In this case, the size of a data unit may be defined as the number of pieces of data included in the data unit. For example, the number of pixels in the spatial domain or the number of transformation coefficients in the transformation domain may represent the size of a data unit.

An encoding method or encoding characteristics of a current data unit may be determined with respect to each data group of any data level from among a data unit, a slice, a picture, and a picture sequence of a video to be currently encoded.

The video encoding apparatus 100 may encode the current picture by performing prediction encoding including inter prediction and intra prediction, transformation, quantization, and entropy encoding on each data unit.

Based on inter prediction, in order to estimate a current pixel value with reference to a pixel value of a temporally previous or subsequent picture, residual data between a pixel value of a reference region of a reference picture and a pixel value of a current picture, and reference data indicating the referred to pixel value may be determined.

In order to more accurately perform inter prediction, the video encoding apparatus 100 may determine the residual data and the reference data by using a sub-pel-unit pixel value. In order to perform sub-pel-unit inter prediction, the video encoding apparatus 100 may determine a sub-pel-unit pixel value located between adjacent integer-pel-unit pixels by interpolating the adjacent integer-pel-unit pixels.

Also, the sub-pel-unit pixel value may be generated by performing interpolation filtering on two or more integer-pel-unit reference pixels including the adjacent integer-pel-unit pixels. The reference pixels for performing interpolation filtering may be pixels of a reference picture.

In order to efficiently perform image interpolation, the video encoding apparatus 100 may selectively determine interpolation filter coefficients. The encoder 120 may include the image interpolation apparatus 10 illustrated in FIG. 1. In other words, in order to perform sub-pel-unit inter prediction, the encoder 120 may generate a sub-pel-unit pixel value by using an interpolation filter including filter coefficients determined by the image interpolation apparatus 10 based on transformation and inverse transformation.

In order to efficiently perform interpolation filtering, the video encoding apparatus 100 may previously store interpolation filter coefficients in memory. According to an interpolation location, a smoothness, the number of filter taps, a bit depth, a scaling factor, and a basis function of interpolation filtering based on transformation may be stored in memory of the video encoding apparatus 100.

For example, at least one of (i) 8-tap ¼-pel-unit filter coefficients {−1, 4, −10, 57, 19, −7, 3, −1} having a scaling factor of $2^6$, (ii) 8-tap ½-pel-unit filter coefficients {−1, 4, −11, 40, 40, −11, 4, −1} having a scaling factor of $2^6$, (iii) 4-tap ⅛-pel-unit filter coefficients {−3, 60, 8, −1} having a scaling factor of $2^6$, (iv) 4-tap ¼-pel-unit filter coefficients {−4, 54, 16, −2} having a scaling factor of $2^6$, (v) 4-tap ⅜-pel-unit filter coefficients {−5, 46, 27, −4} having a scaling factor of $2^6$, and (vi) 4-tap ½-pel-unit filter coefficients {−4, 36, 36, −4} having a scaling factor of $2^6$ may be stored in memory and may be used to perform smoothing interpolation filtering.

In addition to the above-mentioned filter coefficients, smoothing interpolation filter coefficients modifiable based on various basis functions and window functions as shown in FIGS. 8A through 8C, 9A through 9C, 10, 11, and 12A through 12C may be used to perform interpolation filtering.

If interpolation filtering is performed by using the filter coefficients stored in memory, a calculation speed of inter prediction may be improved.

From among a plurality of interpolation filters, the encoder 120 may select and use a desired smoothing interpolation filter to perform inter prediction based on a sub-pel-unit interpolation location α and a smoothness. Besides, a smoothing interpolation filter appropriate for a current pixel may be determined based on the number of filter taps, a bit depth, a scaling factor, etc.

The encoder 120 may determine an interpolation filter based on image characteristics. For example, the encoder 120 may determine different interpolation filters based on color components of pixels. For example, an interpolation filter for luma pixels and an interpolation filter for chroma pixels may be separately selected and thus sub-pel-unit pixel values may be individually generated by performing interpolation filtering.

A video may be encoded by performing inter prediction based on sub-pel-unit interpolation, intra prediction, transformation, and quantization.

The output unit 130 may encode and output encoding information and may output encoded picture data. As the encoding information, information about the selected interpolation filter may be additionally encoded. In other words, information about an interpolation filter used to perform sub-pel-unit prediction encoding may be encoded. For example, a decoder has to know about an interpolation filter used to encode an image in order to decode the image by using the same interpolation filter used in the encoding process. For this, information indicating the used interpolation filter may be encoded together with the image. However, if a filter is selected based on a previous encoding result, i.e., context, information about the selected filter may not be additionally encoded.

The output unit 130 may perform entropy encoding on encoding information and encoded picture data and may output a bitstream.

FIG. 13B is a block diagram of a video decoding apparatus 200 using a smoothing interpolation filter, according to an exemplary embodiment.

The video decoding apparatus 200 includes a receiver and extractor 220 and a decoder 230. Operations of the receiver and extractor 220 and the decoder 230 of the video decoding apparatus 200 may be cooperatively controlled by a video decoding processor, a graphic processor, and a CPU.

In order to reconstruct an image from a bitstream, the video decoding apparatus 200 may decode encoded picture data of the bitstream by performing operations including entropy decoding, inverse quantization, inverse transformation, inter prediction/compensation, and intra prediction/compensation.

The receiver and extractor 220 receives and parses a bitstream of an encoded video. The receiver and extractor 220 may extract encoded data of each data unit of a current picture, and encoding information including information about an encoding method to be used to decode the encoded data, from the parsed bitstream.

If the encoding information includes interpolation filter information, the decoder 230 may read information about an interpolation filter used to perform sub-pel-unit intra prediction from the interpolation filter information, and may perform motion compensation by using the interpolation filter used in an encoding process.

The decoder 230 may decode encoded picture data by performing various decoding operations such as entropy decoding, inverse quantization, inverse transformation, inter prediction/compensation, and intra prediction/compensation on an encoded picture according to various decoding methods determined based on information about a coding mode.

In order to perform motion compensation, a reference region of a reference picture that is temporally previous or subsequent to a current picture may be determined by using reference data, and a pixel value of the reference region and residual data may be combined to reconstruct a current pixel value.

If the residual data and the reference data are determined based on pixels interpolated in a sub-pel unit in an encoding process, the decoder 230 may also perform motion compensation based on pixels interpolated in a sub-pel unit. In order to perform sub-pel-unit motion compensation, the decoder 230 may generate a sub-pel-unit pixel value by interpolating adjacent integer-pel-unit pixels of the reference picture. The sub-pel-unit pixel value may be generated by performing interpolation filtering on two or more integer-pel-unit reference pixels including the adjacent integer-pel-unit pixels.

In order to efficiently perform image interpolation, the video decoding apparatus 200 may selectively determine interpolation filter coefficients. The decoder 230 may include the image interpolation apparatus 10 illustrated in FIG. 1. In other words, in order to perform sub-pel-unit motion compensation, the decoder 230 may generate a sub-pel-unit pixel value by using an interpolation filter based on transformation.

In order to efficiently perform interpolation filtering, the video decoding apparatus 200 may previously store variously selectable interpolation filter coefficients in memory according to an interpolation location, a smoothness, the number of filter taps, a bit depth, a scaling factor, and a basis function of interpolation filtering based on transformation.

As described above, for example, at least one of (i) 8-tap ¼-pel-unit filter coefficients $\{-1, 4, -10, 57, 19, -7, 3, -1\}$ having a scaling factor of $2^6$, (ii) 8-tap ½-pel-unit filter coefficients $\{-1, 4, -11, 40, 40, -11, 4, -1\}$ having a scaling factor of $2^6$, (iii) 4-tap ⅛-pel-unit filter coefficients $\{-3, 60, 8, -1\}$ having a scaling factor of $2^6$, (iv) 4-tap ¼-pel-unit filter coefficients $\{-4, 54, 16, -2\}$ having a scaling factor of $2^6$, (v) 4-tap ⅜-pel-unit filter coefficients $\{-5, 46, 27, -4\}$ having a scaling factor of $2^6$, and (vi) 4-tap ½-pel-unit filter coefficients $\{-4, 36, 36, -4\}$ having a scaling factor of $2^6$ may be stored in memory and may be used to perform smoothing interpolation filtering. In addition to the above-mentioned filter coefficients, smoothing interpolation filter coefficients modifiable according to various basis functions and window functions as shown in FIGS. 8A through 12C may be used to perform smoothing interpolation filtering.

From among a plurality of interpolation filters, the decoder 230 may select and use an interpolation filter appropriate for a current pixel to perform sub-pel-unit motion compensation according to a sub-pel-unit interpolation location α, the number of filter taps, a bit depth, a scaling factor, etc.

Also, the decoder 230 may determine a smoothing interpolation filter based on image characteristics. For example, different interpolation filters may be determined according to color components of pixels, interpolation filtering for luma pixels and interpolation filtering for chroma pixels may be separately performed, and thus interpolated sub-pel-unit pixel values may be individually generated.

Accordingly, the decoder 230 may reconstruct data in a spatial domain by performing inverse quantization/inverse transformation, and may reconstruct pixel values and a current picture by performing intra prediction and motion compensation based on sub-pel-unit interpolation as well as integer-pel-unit interpolation. If pictures are reconstructed, a video may be decoded.

Figure 14A:
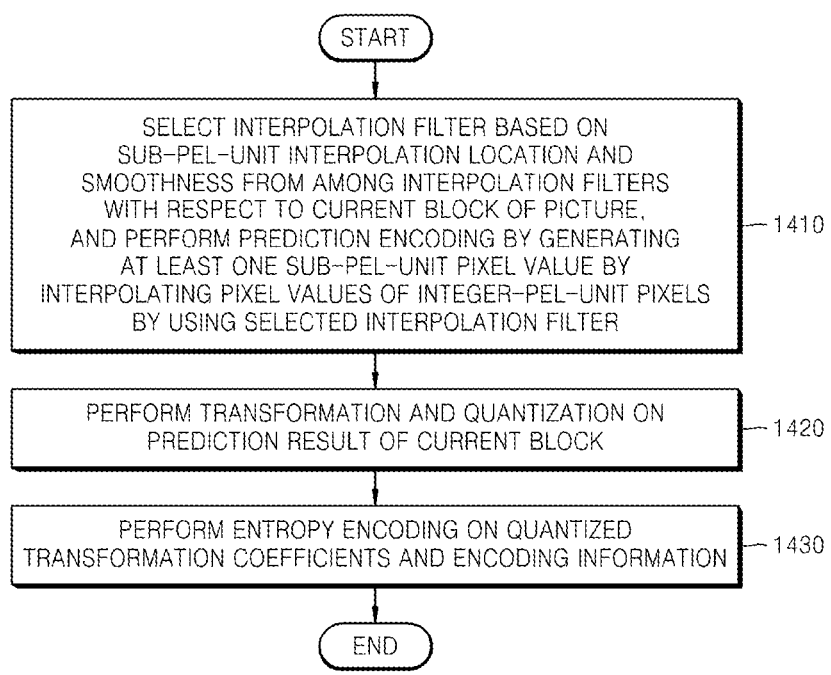
FIG. 14A is a flowchart of an image encoding method using a smoothing interpolation filter, according to an exemplary embodiment.

FIG. 14A is a flowchart of an image encoding method using a smoothing interpolation filter, according to an exemplary embodiment.

In operation 1410, in order to encode a current picture of an input video, prediction encoding using sub-pel-unit interpolation is performed. An interpolation filter is differently selected based on a sub-pel-unit interpolation location and a smoothness from among interpolation filters for generating a sub-pel-unit pixel value. The smoothness of the interpolation filter may be determined based on the distance between an interpolation location and integer-pel units.

The sub-pel-unit pixel value may be generated by performing interpolation filtering on two or more integer-pel-unit reference pixels of a reference picture. Residual data and reference data are determined by using the generated sub-pel-unit pixel value, thereby performing prediction encoding.

In order to efficiently perform image interpolation, interpolation filter coefficients may be selectively determined. From among the interpolation filter coefficients previously stored in memory, a desired interpolation filter may be selected based on a sub-pel-unit interpolation location, a smoothness, the number of filter taps, a bit depth, a scaling factor, a basis function of interpolation filtering based on transformation, and a color component, and interpolation may be performed to generate the sub-pel-unit pixel value.

In operation 1420, transformation and quantization are performed on an inter prediction result based on sub-pel-unit interpolation, and intra prediction.

In operation 1430, a bitstream may be output by performing entropy encoding on encoding information and encoded picture data in the form of quantized transformation coefficients. The encoding information may include information about an interpolation filter used to perform sub-pel-unit prediction encoding.

Figure 14B:
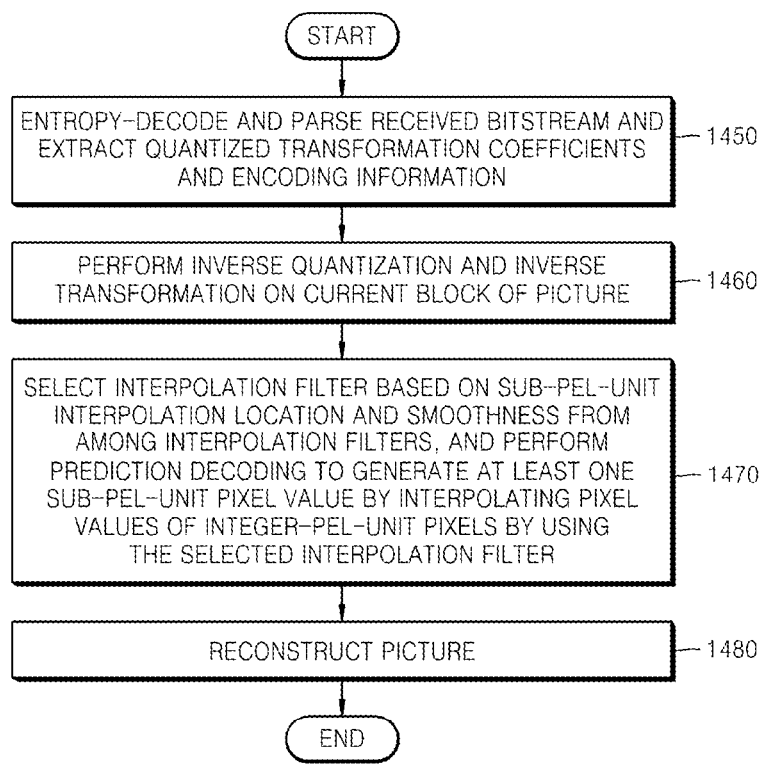
FIG. 14B is a flowchart of an image decoding method using a smoothing interpolation filter, according to an exemplary embodiment.

FIG. 14B is a flowchart of an image decoding method using a smoothing interpolation filter, according to an exemplary embodiment.

In operation 1450, a bitstream of an encoded video is received, entropy-decoded, and parsed to extract quantized transformation coefficients and encoding information of a current picture from the bitstream.

If the encoding information includes information about an interpolation filter, the type of a required interpolation filter may be read from the information.

In operation 1460, according to various decoding methods determined based on a coding mode read from the encoding information, inverse quantization and inverse transformation are performed on the quantized transformation coefficients, and residual data is added, thereby reconstructing data in a spatial domain.

In operation 1470, encoded picture data may be decoded by performing various decoding operations such as motion compensation and intra prediction based on the coding mode.

Specifically, if encoded residual data and reference data are extracted based on pixels interpolated in a sub-pel unit, motion compensation may be performed based on the pixels interpolated in a sub-pel unit. From among interpolation filters for generating a sub-pel-unit pixel value, an interpolation filter is differently selected based on a sub-pel-unit interpolation location and a smoothness.

In order to efficiently perform image interpolation, interpolation filter coefficients may be selectively determined. From among the interpolation filter coefficients previously stored in memory, a desired interpolation filter may be selected according to a sub-pel-unit interpolation location, a smoothness, the number of filter taps, a bit depth, a scaling factor, a basis function of interpolation filtering based on transformation, and a color component, and interpolation may be performed to generate the sub-pel-unit pixel value. Since motion compensation is performed on pixels interpolated by using the interpolation filter coefficients previously stored in memory, a calculation speed may be increased.

A reference picture and a reference region are determined by using the reference data, and the sub-pel-unit pixel value may be generated by performing interpolation filtering on two or more integer-pel-unit reference pixels of the reference picture. Motion compensation may be performed by combining the generated sub-pel-unit pixel value and the residual data, and thus prediction decoding may be performed.

In operation 1480, a current picture is reconstructed by using pixel values obtained by performing prediction decoding, and thus a video is decoded.

<Video Encoding and Decoding Using Smoothing Interpolation Based on Coding Units Having Tree Structure>

Video encoding and decoding apparatuses using a smoothing interpolation filter based on coding units having a tree structure, and video encoding and decoding methods corresponding to the video encoding and decoding apparatuses, according to exemplary embodiments, will now be described in detail with reference to FIGS. 13A, 13B, 14A, 14B, and 15 through 27.

The video encoding apparatus 100 may encode a video based on coding units and transformation units having a tree structure.

A current picture of a video may be split based on a maximum coding unit for the current picture. If the current picture is larger than the maximum coding unit, image data of the current picture may be split into at least one maximum coding unit. The maximum coding unit may be a data unit having a size of 32×32, 64×64, 128×128, 256×256, etc., wherein a shape of the data unit is a square having a width and length in squares of 2. The encoder 120 may encode picture data of each of at least one maximum coding unit.

A coding unit according to an exemplary embodiment may be characterized by a maximum size and a depth. The depth denotes a number of times the coding unit is spatially split from the maximum coding unit, and as the depth deepens, deeper coding units according to depths may be split from the maximum coding unit to a minimum coding unit. A depth of the maximum coding unit is an uppermost depth and a depth of the minimum coding unit is a lowermost depth. Since a size of a coding unit corresponding to each depth decreases as the depth of the maximum coding unit deepens, a coding unit corresponding to an upper depth may include a plurality of coding units corresponding to lower depths.

As described above, the image data of the current picture is split into the maximum coding units according to a maximum size of the coding unit, and each of the maximum coding units may include deeper coding units that are split according to depths. Since the maximum coding unit according to an exemplary embodiment is split according to depths, the image data of a spatial domain included in the maximum coding unit may be hierarchically classified according to depths.

A maximum depth and a maximum size of a coding unit, which limit the total number of times a height and a width of the maximum coding unit are hierarchically split, may be predetermined.

The encoder 120 encodes at least one split region obtained by splitting a region of the maximum coding unit according to depths, and determines a depth to output finally encoded image data according to the at least one split region. In other words, the encoder 120 determines a coded depth by encoding the image data in the deeper coding units according to depths, according to the maximum coding unit of the current picture, and selecting a depth having the least encoding error.

The encoder 120 may output the encoded image data of the coding unit corresponding to the determined coded depth. Also, the encoder 120 may transmit information about the determined coded depth to the output unit 130 such that the information about the coded depth may be encoded as encoding information.

The image data in the maximum coding unit is encoded based on the deeper coding units corresponding to at least one depth equal to or below the maximum depth, and results of encoding the image data are compared based on each of the deeper coding units. A depth having the least encoding error may be selected after comparing encoding errors of the deeper coding units. At least one coded depth may be selected for each maximum coding unit.

The size of the maximum coding unit is split as a coding unit is hierarchically split according to depths, and as the number of coding units increases. Also, even if coding units correspond to the same depth in one maximum coding unit, it is determined whether to split each of the coding units corresponding to the same depth to a lower depth by measuring an encoding error of the image data of each coding unit, separately. Accordingly, even when image data is included in one maximum coding unit, the image data is split into regions according to the depths and the encoding errors may differ according to regions in the one maximum coding unit, and thus the coded depths may differ according to regions in the image data. Thus, one or more coded depths may be determined in one maximum coding unit, and the image data of the maximum coding unit may be divided according to coding units of at least one coded depth.

Accordingly, the encoder 120 may determine coding units having a tree structure included in the maximum coding unit. The 'coding units having a tree structure' according to an exemplary embodiment include coding units corresponding to a depth determined to be the coded depth, from among all deeper coding units included in the maximum coding unit. A coding unit of a coded depth may be hierarchically determined according to depths in the same region of the maximum coding unit, and may be independently determined in different regions. Similarly, a coded depth in a current region may be independently determined from a coded depth in another region.

A maximum depth according to an exemplary embodiment is an index related to the number of times splitting is performed from a maximum coding unit to a minimum coding unit. A first maximum depth according to an exemplary embodiment may denote the total number of times splitting is performed from the maximum coding unit to the minimum coding unit. A second maximum depth according to an exemplary embodiment may denote the total number of depth levels from the maximum coding unit to the minimum coding unit. For example, when a depth of the maximum coding unit is 0, a depth of a coding unit, in which the maximum coding unit is split once, may be set to 1, and a depth of a coding unit, in which the maximum coding unit is split twice, may be set to 2. Here, if the minimum coding unit is a coding unit in which the maximum coding unit is split four times, 5 depth levels of depths 0, 1, 2, 3 and 4 exist, and thus the first maximum depth may be set to 4, and the second maximum depth may be set to 5.

Prediction encoding and transformation may be performed according to the maximum coding unit. The prediction encoding and the transformation are also performed based on the deeper coding units according to a depth equal to or depths less than the maximum depth, according to the maximum coding unit.

Since the number of deeper coding units increases whenever the maximum coding unit is split according to depths, encoding including the prediction encoding and the transformation is performed on all of the deeper coding units generated as the depth deepens. For convenience of description, the prediction encoding and the transformation will now be described based on a coding unit of a current depth, in a maximum coding unit.

The video encoding apparatus 100 may variously select a size or shape of a data unit for encoding the image data. In order to encode the image data, operations, such as prediction encoding, transformation, and entropy encoding, are performed, and at this time, the same data unit may be used for all operations or different data units may be used for each operation.

For example, the video encoding apparatus 100 may select not only a coding unit for encoding the image data, but also a data unit different from the coding unit so as to perform the prediction encoding on the image data in the coding unit.

In order to perform prediction encoding in the maximum coding unit, the prediction encoding may be performed based on a coding unit corresponding to a coded depth, i.e., based on a coding unit that is no longer split to coding units corresponding to a lower depth. Hereinafter, the coding unit that is no longer split and becomes a basic unit for prediction encoding will now be referred to as a 'prediction unit'. A partition obtained by splitting the prediction unit may include a prediction unit or a data unit obtained by splitting at least one of a height and a width of the prediction unit.

For example, when a coding unit of 2N×2N (where N is a positive integer) is no longer split and becomes a prediction unit of 2N×2N, a size of a partition may be 2N×2N, 2N×N, N×2N, or N×N. Examples of a partition type include symmetric partitions that are obtained by symmetrically splitting a height or width of the prediction unit, partitions obtained by asymmetrically splitting the height or width of the prediction unit, such as 1:n or n:1, partitions that are obtained by geometrically splitting the prediction unit, and partitions having arbitrary shapes.

A prediction mode of the prediction unit may be at least one of an intra mode, a inter mode, and a skip mode. For example, the intra mode or the inter mode may be performed on the partition of 2N×2N, 2N×N, N×2N, or N×N. Also, the skip mode may be performed only on the partition of 2N×2N. The encoding is independently performed on one prediction unit in a coding unit, thereby selecting a prediction mode having a least encoding error.

The video encoding apparatus 100 may also perform the transformation on the image data in a coding unit based not only on the coding unit for encoding the image data, but also based on a data unit that is different from the coding unit.

In order to perform the transformation in the coding unit, the transformation may be performed based on a transformation unit having a size smaller than or equal to the coding unit. For example, the transformation unit for the transformation may include a data unit for an intra mode and a data unit for an inter mode.

Similarly to the coding unit, the transformation unit in the coding unit may be recursively split into smaller sized regions, so that the transformation unit may be determined independently in units of regions. Thus, residual data in the coding unit may be divided according to the transformation units having the tree structure according to transformation depths.

A transformation depth indicating the number of times splitting is performed to reach the transformation unit by splitting the height and width of the coding unit may also be set in the transformation unit. For example, in a current coding unit of 2N×2N, a transformation depth may be 0 when the size of a transformation unit is also 2N×2N, may be 1 when the size of the transformation unit is N×N, and may be 2 when the size of the transformation unit is N/2×N/2. In other words, transformation units having a tree structure may be set according to transformation depths.

Encoding information according to a coded depth uses not only information about the coded depth, but also information about prediction encoding and transformation. Accordingly, the encoder 120 not only determines a coded depth having a least encoding error, but also determines a partition type in a prediction unit, a prediction mode according to prediction units, and a size of a transformation unit for transformation. For inter prediction, the encoding information according to a coded depth may include information related to interpolation filtering for interpolating sub-pel units.

Also, the encoder 120 may perform transformation by using transformation units having a tree structure to encode coding units, based on a maximum split level of the transformation units, which is previously and restrictively set in each maximum coding unit or a current coding unit.

In each of deeper coding units according to depths, a basic transformation unit having a size smaller than or equal to a coding unit may be hierarchically split into transformation units of lower transformation depths. Transformation units having a tree structure may include a basic transformation unit having a maximum size that is currently allowed, and lower-level transformation units relative to a maximum split level that is allowed for coding units.

After performing transformation in each level according to a transformation depth in a current coding unit, the encoder 120 may determine transformation units having a tree structure, which are independent from transformation units of adjacent regions and form a hierarchical structure between transformation units in the same region according to transformation depths.

In other words, transformation units having a tree structure may be determined by performing transformation on each coding unit by using various-sized transformation units and then comparing results of transformation. While a coding unit is being determined, a transformation unit for transforming the coding unit may be determined. Whenever coding units according to each of one or more depths are encoded, transformation units according to each of one or more transformation depths may be used to perform transformation.

A transformation unit having a least encoding error has to be determined for each coding unit. In order to determine a transformation depth having a minimum encoding error in a transformation unit, encoding errors may be measured and compared in all deeper transformation units according to depths. A transformation unit may be determined as a data unit for minimizing a transformation error of a coding unit.

Accordingly, since a combination of a deeper coding unit and a deeper transformation unit according to depths, which has a least encoding error, is individually determined in each region of a maximum coding unit, coding units having a tree structure and transformation units having a tree structure may be determined.

Methods of determining coding units having a tree structure, partitions, and transformation units having a tree structure in a maximum coding unit, according to exemplary embodiments, will be described in detail later with reference to FIGS. 15 through 25.

The encoder 120 may measure an encoding error of deeper coding units according to depths by using rate-distortion optimization based on Lagrangian multipliers.

The video encoding apparatus 100 may output the image data of the maximum coding unit, which is encoded based on the at least one coded depth determined by the encoder 120, and information about a coding mode according to the coded depth, which is encoded by the output unit 130, in the form of a bitstream.

The information about the coding mode of deeper coding units according to depths, which is determined as a picture is encoded based on coding units, prediction units, and transformation units having a tree structure, may be included in a header, a sequence parameter set (SPS), or a picture parameter set (PPS) of a bitstream.

The encoded image data may be obtained by encoding residual data of an image.

The information about the coding mode according to the coded depth may include information about the coded depth, about the partition type in the prediction unit, the prediction mode, and the size of the transformation unit.

The information about the coded depth may be defined by using split information according to depths, which represents whether encoding is performed on coding units of a lower depth instead of a current depth. If the current depth of the current coding unit is the coded depth, image data in the current coding unit is encoded and output, and thus the split information may be defined not to split the current coding unit to a lower depth. Alternatively, if the current depth of the current coding unit is not the coded depth, the encoding is performed on the coding unit of the lower depth, and thus the split information may be defined to split the current coding unit to obtain the coding units of the lower depth.

If the current depth is not the coded depth, encoding is performed on the coding unit that is split into the coding unit of the lower depth. Since at least one coding unit of the lower depth exists in one coding unit of the current depth, the encoding is repeatedly performed on each coding unit of the lower depth, and thus the encoding may be recursively performed for the coding units having the same depth.

Since the coding units having a tree structure are determined for one maximum coding unit, and information about at least one coding mode is determined for a coding unit of a coded depth, information about at least one coding mode may be determined for one maximum coding unit. Also, a coded depth of the image data of the maximum coding unit may be different according to locations since the image data is hierarchically split according to depths, and thus information about the coded depth and the coding mode may be set for the image data.

Accordingly, the output unit 130 may assign encoding information about a corresponding coded depth and a coding mode to at least one of the coding unit, the prediction unit, and a minimum unit included in the maximum coding unit.

The minimum unit according to an exemplary embodiment is a rectangular data unit obtained by splitting the minimum coding unit constituting the lowermost depth by 4. Alternatively, the minimum unit may be a maximum rectangular data unit that may be included in all of the coding units, prediction units, partition units, and transformation units included in the maximum coding unit.

For example, the encoding information output through the output unit 130 may be classified into encoding information according to coding units, and encoding information according to prediction units. The encoding information according to the coding units may include the information about the prediction mode and about the size of the partitions. The encoding information according to the prediction units may include information about an estimated direction of an inter mode, about a reference image index of the inter mode, about a motion vector, about a chroma component of an intra mode, and about an interpolation method of the intra mode.

Information about a maximum size of the coding unit defined according to pictures, slices, or GOPs, and information about a maximum depth may be inserted into a header, an SPS, or a PPS of a bitstream.

In the video encoding apparatus 100, the deeper coding unit may be a coding unit obtained by dividing a height or width of a coding unit of an upper depth, which is one layer above, by two. In other words, when the size of the coding unit of the current depth is 2N×2N, the size of the coding unit of the lower depth is N×N. Also, the coding unit of the current depth having the size of 2N×2N may include maximum 4 of the coding unit of the lower depth.

Accordingly, the video encoding apparatus 100 may form the coding units having the tree structure by determining coding units having an optimum shape and an optimum size for each maximum coding unit, based on the size of the maximum coding unit and the maximum depth determined considering characteristics of the current picture. Also, since encoding may be performed on each maximum coding unit by using any one of various prediction modes and transformations, an optimum coding mode may be determined considering characteristics of the coding unit of various image sizes.

Thus, if an image having high resolution or large data amount is encoded in a related art macroblock, a number of macroblocks per picture excessively increases. Accordingly, a number of pieces of compressed information generated for each macroblock increases, and thus it is difficult to transmit the compressed information and data compression efficiency decreases. However, by using the video encoding apparatus 100, image compression efficiency may be increased since a coding unit is adjusted while considering characteristics of an image while increasing a maximum size of a coding unit while considering a size of the image.

The output unit 130 may encode and output encoding information indicating an encoding method used to encode a video based on coding units having a tree structure and transformation units having a tree structure. The encoding information may include information about various coding modes of coding units corresponding to a coded depth, and information about the coded depth.

Definitions of various terms, such as a coding unit, a depth, a prediction unit, a transformation unit, and information about various coding modes, for various operations of the video decoding apparatus 200 are identical to those described with reference to the video encoding apparatus 100.

The receiver 210 receives a bitstream of an encoded video. The receiver and extractor 220 parses the received bitstream. The receiver and extractor 220 extracts encoded picture data for each coding unit from the parsed bitstream, wherein the coding units have a tree structure according to each maximum coding unit, and outputs the extracted picture data to the decoder 230. The receiver and extractor 220 may extract information about a maximum size of a coding unit of a current picture, from a header, an SPS, or a PPS about the current picture.

Also, the receiver and extractor 220 may extract encoding information about the coding units having a tree structure according to each maximum coding unit, from the parsed bitstream. Information about a coded depth and a coding mode is extracted from the encoding information. The extracted information about the coded depth and the coding mode is output to the decoder 230. In other words, the image data in a bitstream may be split into the maximum coding unit so that the decoder 230 may decode the image data for each maximum coding unit.

The information about the coded depth and the coding mode according to the maximum coding unit may be set for information about at least one coding unit corresponding to the coded depth, and information about a coding mode may include information about a partition type of a corresponding coding unit corresponding to the coded depth, about a prediction mode, and a size of a transformation unit. For inter prediction, information related to interpolation filtering for interpolating sub-pel units may be extracted from the encoding information according to a coded depth. Also, splitting information according to depths may be extracted as the information about the coded depth.

The information about the coded depth and the coding mode according to each maximum coding unit extracted by the receiver and extractor 220 is information about a coded depth and a coding mode determined to generate a minimum encoding error when an encoder, such as the video encoding apparatus 100, repeatedly performs encoding for each deeper coding unit according to depths according to each maximum coding unit. Accordingly, the video decoding apparatus 200 may reconstruct an image by decoding the image data according to a coded depth and a coding mode that generates the minimum encoding error.

Since encoding information about the coded depth and the coding mode may be assigned to a predetermined data unit from among a corresponding coding unit, a prediction unit, and a minimum unit, the receiver and extractor 220 may extract the information about the coded depth and the coding mode according to the predetermined data units. The predetermined data units to which the same information about the coded depth and the coding mode is assigned may be inferred to be the data units included in the same maximum coding unit.

The decoder 230 may determine at least one coded depth of a current maximum coding unit by using split information according to depths. If the split information represents that image data is no longer split in the current depth, the current depth is a coded depth. Accordingly, the decoder 230 may decode encoded picture data of at least one coding unit corresponding to the each coded depth in the current maximum coding unit by using the information about the partition type of the prediction unit, the prediction mode, and the size of the transformation unit for each coding unit corresponding to the coded depth, and output the image data of the current maximum coding unit.

In other words, data units containing the encoding information including the same split information may be gathered by observing the encoding information set assigned for the predetermined data unit from among the coding unit, the prediction unit, and the minimum unit, and the gathered data units may be considered to be one data unit to be decoded by the decoder 230 in the same coding mode.

The decoder 230 may reconstruct the current picture by decoding the encoded picture data in each maximum coding unit based on the information about the coded depth and the coding mode according to the maximum coding units. The partition type, the prediction mode, and the transformation unit may be read as the coding mode for each coding unit from among the coding units having the tree structure included in each maximum coding unit. A decoding process may include a prediction including intra prediction and motion compensation, and an inverse transformation.

The decoder 230 may perform intra prediction or motion compensation according to a partition and a prediction mode of each coding unit, based on the information about the partition type and the prediction mode of the prediction unit of the coding units having a tree structure.

Also, the decoder 230 may read the structure of transformation units having a tree structure and may perform inverse transformation on each coding unit based on the transformation units.

The video decoding apparatus 200 may obtain information about at least one coding unit that generates the minimum encoding error when encoding is recursively performed for each maximum coding unit, and may use the information to decode the current picture. In other words, the coding units having the tree structure determined to be the optimum coding units in each maximum coding unit may be decoded. Also, the maximum size of coding unit is determined in consideration of resolution and an amount of image data.

Accordingly, even if image data has high resolution and a large amount of data, the image data may be efficiently decoded and reconstructed by using a size of a coding unit and a coding mode, which are adaptively determined according to characteristics of the image data, by using information about an optimum coding mode received from an encoder.

Figure 15:
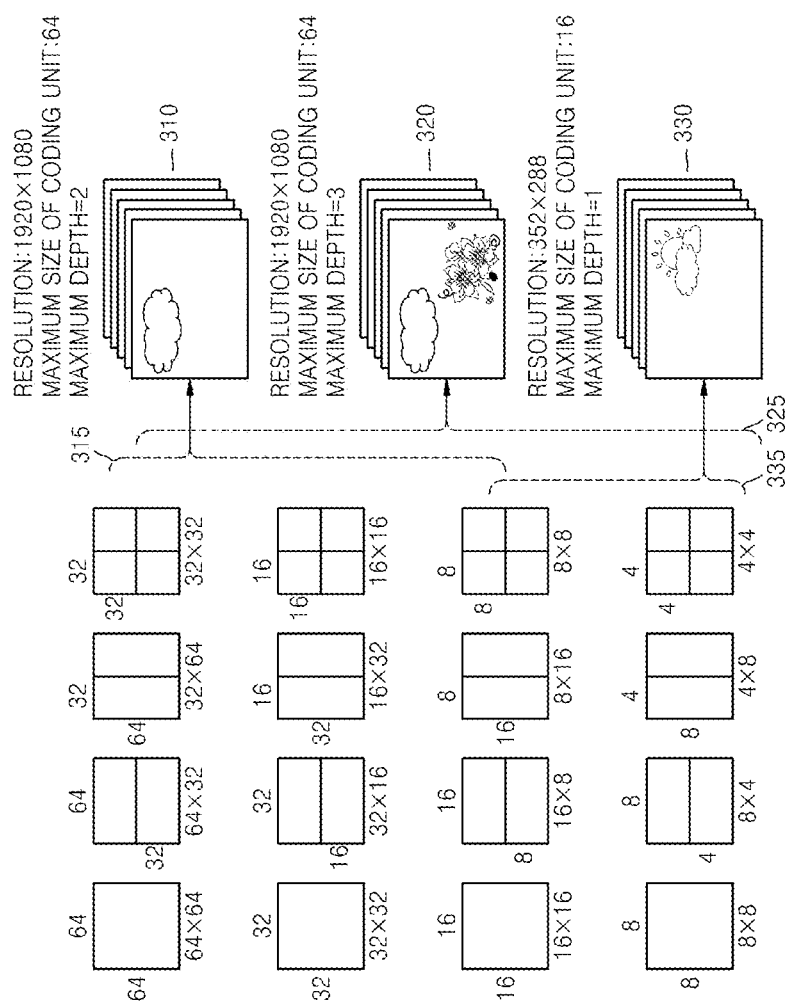
FIG. 15 is a diagram for describing a concept of coding units according to an exemplary embodiment.

FIG. 15 is a diagram for describing a concept of coding units according to an exemplary embodiment.

A size of a coding unit may be expressed in width×height, and may be 64×64, 32×32, 16×16, and 8×8. A coding unit of 64×64 may be split into partitions of 64×64, 64×32, 32×64, or 32×32, a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 310, a resolution is 1920×1080, a maximum size of a coding unit is 64, and a maximum depth is 2. In video data 320, a resolution is 1920×1080, a maximum size of a coding unit is 64, and a maximum depth is 3. In video data 330, a resolution is 352×288, a maximum size of a coding unit is 16, and a maximum depth is 1. The maximum depth shown in FIG. 15 denotes a total number of splits from a maximum coding unit to a minimum decoding unit.

If a resolution is high or a data amount is large, a maximum size of a coding unit may be large so as to not only increase encoding efficiency but also to accurately reflect characteristics of an image. Accordingly, the maximum size of the coding unit of the video data 310 and 320 having the higher resolution than the video data 330 may be 64.

Since the maximum depth of the video data 310 is 2, coding units 315 of the vide data 310 may include a maximum coding unit having a long axis size of 64, and coding units having long axis sizes of 32 and 16 since depths are deepened to two layers by splitting the maximum coding unit twice. Meanwhile, since the maximum depth of the video data 330 is 1, coding units 335 of the video data 330 may include a maximum coding unit having a long axis size of 16, and coding units having a long axis size of 8 since depths are deepened to one layer by splitting the maximum coding unit once.

Since the maximum depth of the video data 320 is 3, coding units 325 of the video data 320 may include a maximum coding unit having a long axis size of 64, and coding units having long axis sizes of 32, 16, and 8 since the depths are deepened to 3 layers by splitting the maximum coding unit three times. As a depth deepens, detailed information may be precisely expressed.

Figure 16:
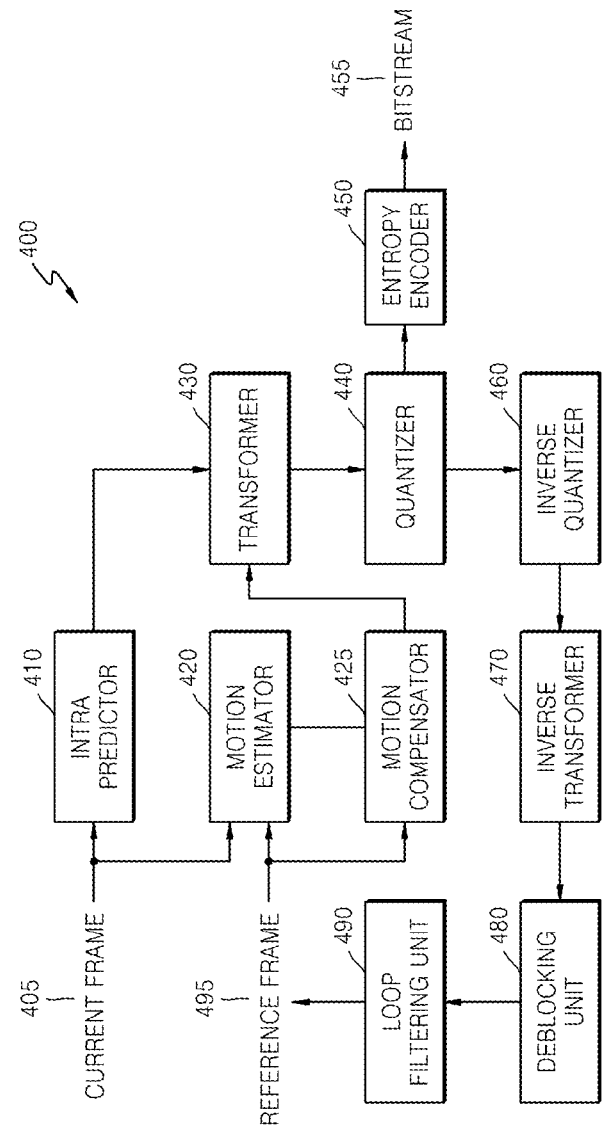
FIG. 16 is a block diagram of an image encoder based on coding units, according to an exemplary embodiment.

FIG. 16 is a block diagram of an image encoder 400 based on coding units, according to an exemplary embodiment.

The image encoder 400 performs operations of the encoder 120 of the video encoding apparatus 100 to encode image data. In other words, an intra predictor 410 performs intra prediction on coding units in an intra mode, from among a current frame 405, and a motion estimator 420 and a motion compensator 425 performs inter estimation and motion compensation on coding units in an inter mode from among the current frame 405 by using the current frame 405, and a reference frame 495.

In order to precisely perform motion estimation by using reference pixels in sub-pel units, the motion estimator 420 and the motion compensator 425 may generate pixels in sub-pel units by interpolating pixels in integer-pel units. An interpolation filter for generating pixels in sub-pel units may be the smoothing interpolation filter described above in relation to FIGS. 1 and 13A.

Data output from the intra predictor 410, the motion estimator 420, and the motion compensator 425 is output as a quantized transformation coefficient through a transformer 430 and a quantizer 440. The quantized transformation coefficient is reconstructed as data in a spatial domain through an inverse quantizer 460 and an inverse transformer 470, and the reconstructed data in the spatial domain is output as the reference frame 495 after being post-processed through a deblocking filter 480 and a loop filter 490. The quantized transformation coefficient may be output as a bitstream 455 through an entropy encoder 450.

In order for the image encoder 400 to be applied in the video encoding apparatus 100, all elements of the image encoder 400, i.e., the intra predictor 410, the motion estimator 420, the motion compensator 425, the transformer 430, the quantizer 440, the entropy encoder 450, the inverse quantizer 460, the inverse transformer 470, the deblocking filter 480, and the loop filter 490, have to perform operations based on each coding unit from among coding units having a tree structure while considering the maximum depth of each maximum coding unit.

Specifically, the intra predictor 410, the motion estimator 420, and the motion compensator 425 have to determine partitions and a prediction mode of each coding unit from among the coding units having a tree structure while considering the maximum size and the maximum depth of a current maximum coding unit, and the transformer 430 has to determine the size of the transformation unit in each coding unit from among the coding units having a tree structure.

Figure 17:
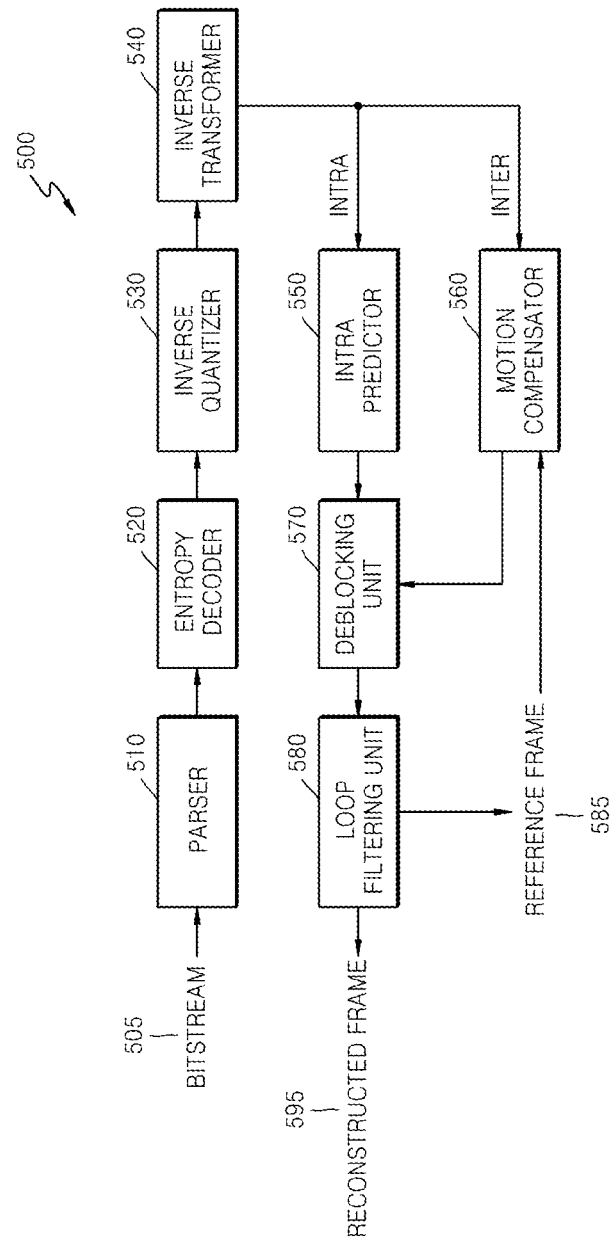
FIG. 17 is a block diagram of an image decoder based on coding units, according to an exemplary embodiment.

FIG. 17 is a block diagram of an image decoder 500 based on coding units, according to an exemplary embodiment.

A parser 510 parses encoded image data to be decoded and information about encoding required for decoding from a bitstream 505. The encoded image data is output as inversely quantized data through an entropy decoder 520 and an inverse quantizer 530, and the inversely quantized data is reconstructed to image data in a spatial domain through an inverse transformer 540.

An intra predictor 550 performs intra prediction on coding units in an intra mode with respect to the image data in the spatial domain, and a motion compensator 560 performs motion compensation on coding units in an inter mode by using a reference frame 585.

In order to precisely perform motion estimation by using reference pixels in sub-pel units, the motion compensator 560 may generate pixels in sub-pel units by interpolating pixels in integer-pel units. An interpolation filter for generating pixels in sub-pel units may be the smoothing interpolation filter described above in relation to FIGS. 2 and 13B.

The image data in the spatial domain, which passed through the intra predictor 550 and the motion compensator 560, may be output as a reconstructed frame 595 after being post-processed through a deblocking filter 570 and a loop filter 580. Also, the image data that is post-processed through the deblocking filter 570 and the loop filter 580 may be output as the reference frame 585.

In order to decode the image data in the decoder 230 of the video decoding apparatus 200, the image decoder 500 may perform operations that are performed after the parser 510.

In order for the image decoder 500 to be applied in the video decoding apparatus 200, all elements of the image decoder 500, i.e., the parser 510, the entropy decoder 520, the inverse quantizer 530, the inverse transformer 540, the intra predictor 550, the motion compensator 560, the deblocking filter 570, and the loop filter 580, have to perform operations based on coding units having a tree structure for each maximum coding unit.

Specifically, the intra prediction 550 and the motion compensator 560 have to determine partitions and a prediction mode for each of the coding units having a tree structure, and the inverse transformer 540 has to determine a size of a transformation unit for each coding unit.

Figure 18:
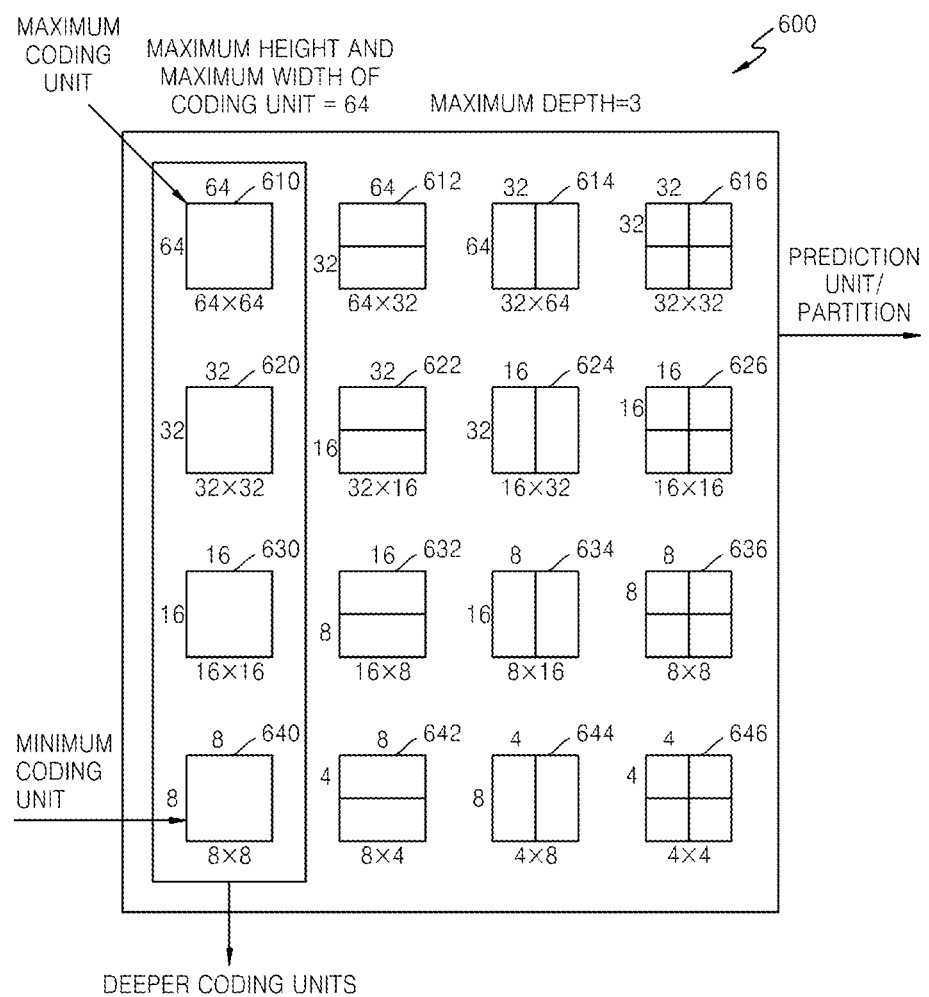
FIG. 18 is a diagram illustrating deeper coding units according to depths, and partitions, according to an exemplary embodiment.

FIG. 18 is a diagram illustrating deeper coding units according to depths, and partitions, according to an exemplary embodiment.

The video encoding apparatus 100 and the video decoding apparatus 200 use hierarchical coding units so as to consider characteristics of an image. A maximum height, a maximum width, and a maximum depth of coding units may be adaptively determined according to the characteristics of the image, or may be differently set by a user. Sizes of deeper coding units according to depths may be determined according to the predetermined maximum size of the coding unit.

In a hierarchical structure 600 of coding units, according to an exemplary embodiment, the maximum height and the maximum width of the coding units are each 64, and the maximum depth is 3. In this case, the maximum depth denotes the total number of times splitting is performed from a maximum coding unit to a minimum coding unit. Since a depth deepens along a vertical axis of the hierarchical structure 600, a height and a width of the deeper coding unit are each split. Also, a prediction unit and partitions, which are bases for prediction encoding of each deeper coding unit, are shown along a horizontal axis of the hierarchical structure 600.

In other words, a coding unit 610 is a maximum coding unit in the hierarchical structure 600, wherein a depth is 0 and a size, i.e., a height by width, is 64×64. The depth deepens along the vertical axis, and a coding unit 620 having a size of 32×32 and a depth of 1, a coding unit 630 having a size of 16×16 and a depth of 2, and a coding unit 640 having a size of 8×8 and a depth of 3 exist. The coding unit 640 having the size of 8×8 and the depth of 3 is a minimum coding unit.

The prediction unit and the partitions of a coding unit are arranged along the horizontal axis according to each depth. In other words, if the coding unit 610 having the size of 64×64 and the depth of 0 is a prediction unit, the prediction unit may be split into partitions included in the coding unit 610, i.e., a partition 610 having a size of 64×64, partitions 612 having the size of 64×32, partitions 614 having the size of 32×64, or partitions 616 having the size of 32×32.

Similarly, a prediction unit of the coding unit 620 having the size of 32×32 and the depth of 1 may be split into partitions included in the coding unit 620, i.e., a partition 620 having a size of 32×32, partitions 622 having a size of 32×16, partitions 624 having a size of 16×32, or partitions 626 having a size of 16×16.

Similarly, a prediction unit of the coding unit 630 having the size of 16×16 and the depth of 2 may be split into partitions included in the coding unit 630, i.e., a partition having a size of 16×16, partitions 632 having a size of 16×8, partitions 634 having a size of 8×16, or partitions 636 having a size of 8×8.

Similarly, a prediction unit of the coding unit 640 having the size of 8×8 and the depth of 3 may be split into partitions included in the coding unit 640, i.e., a partition having a size of 8×8, partitions 642 having a size of 8×4, partitions 644 having a size of 4×8, or partitions 646 having a size of 4×4.

In order to determine the at least one coded depth of the coding units constituting the maximum coding unit 610, the encoder 120 of the video encoding apparatus 100 performs encoding for coding units corresponding to each depth included in the maximum coding unit 610.

A number of deeper coding units according to depths including data in the same range and the same size increases as the depth deepens. For example, four coding units corresponding to a depth of 2 are required to cover data that is included in one coding unit corresponding to a depth of 1. Accordingly, in order to compare encoding results of the same data according to depths, the coding unit corresponding to the depth of 1 and four coding units corresponding to the depth of 2 are each encoded.

In order to perform encoding for a current depth from among the depths, a least encoding error may be selected for the current depth by performing encoding for each prediction unit in the coding units corresponding to the current depth, along the horizontal axis of the hierarchical structure 600. Alternatively, the minimum encoding error may be searched for by comparing the least encoding errors according to depths, by performing encoding for each depth as the depth deepens along the vertical axis of the hierarchical structure 600. A depth and a partition having the minimum encoding error in the coding unit 610 may be selected as the coded depth and a partition type of the coding unit 610.

Figure 19:
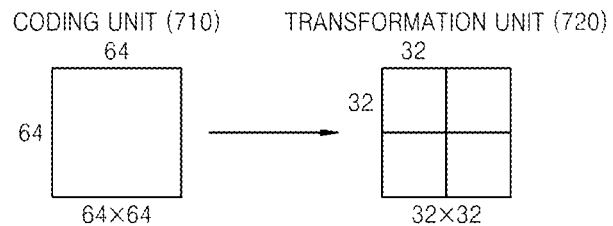
FIG. 19 is a diagram for describing a relationship between a coding unit and transformation units, according to an exemplary embodiment.

FIG. 19 is a diagram for describing a relationship between a coding unit 710 and transformation units 720, according to an exemplary embodiment.

The video encoding apparatus 100 or the video decoding apparatus 200 encodes or decodes an image according to coding units having sizes smaller than or equal to a maximum coding unit for each maximum coding unit. Sizes of transformation units for transformation during encoding may be selected based on data units that are not larger than a corresponding coding unit.

For example, in the video encoding apparatus 100 or the video decoding apparatus 200, if a size of the coding unit 710 is 64×64, transformation may be performed by using the transformation units 720 having a size of 32×32.

Also, data of the coding unit 710 having the size of 64×64 may be encoded by performing the transformation on each of the transformation units having the size of 32×32, 16×16, 8×8, and 4×4, which are smaller than 64×64, and then a transformation unit having the least coding error may be selected.

Figure 20:
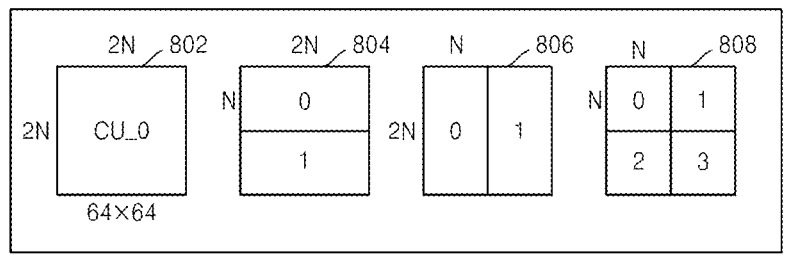
FIG. 20 is a diagram for describing encoding information of coding units corresponding to a coded depth, according to an exemplary embodiment.
Figure 20:
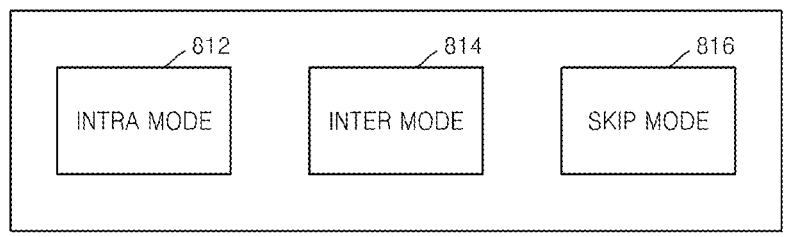
Figure 20:
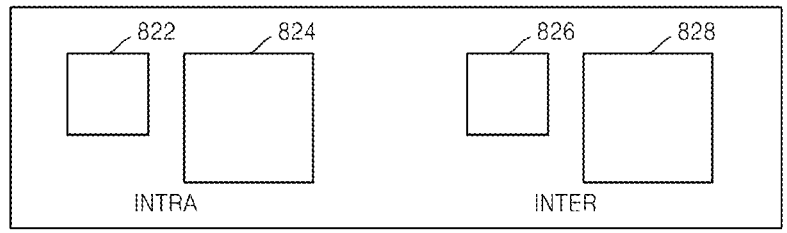

FIG. 20 is a diagram for describing encoding information of coding units corresponding to a coded depth, according to an exemplary embodiment.

The output unit 130 of the video encoding apparatus 100 may encode and transmit information 800 about a partition type, information 810 about a prediction mode, and information 820 about a size of a transformation unit for each coding unit corresponding to a coded depth, as information about a coding mode.

The information 800 represents information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 802 having a size of 2N×2N, a partition 804 having a size of 2N×N, a partition 806 having a size of N×2N, and a partition 808 having a size of N×N. Here, the information 800 about a partition type is set to indicate one of the partition 804 having a size of 2N×N, the partition 806 having a size of N×2N, and the partition 808 having a size of N×N The information 810 represents a prediction mode of each partition. For example, the information 810 may indicate a mode of prediction encoding performed on a partition represented by the information 800, i.e., an intra mode 812, an inter mode 814, or a skip mode 816.

The information 820 represents a transformation unit to be based on when transformation is performed on a current coding unit. For example, the transformation unit may be a first intra transformation unit 822, a second intra transformation unit 824, a first inter transformation unit 826, or a second inter transformation unit 828.

Figure 21:
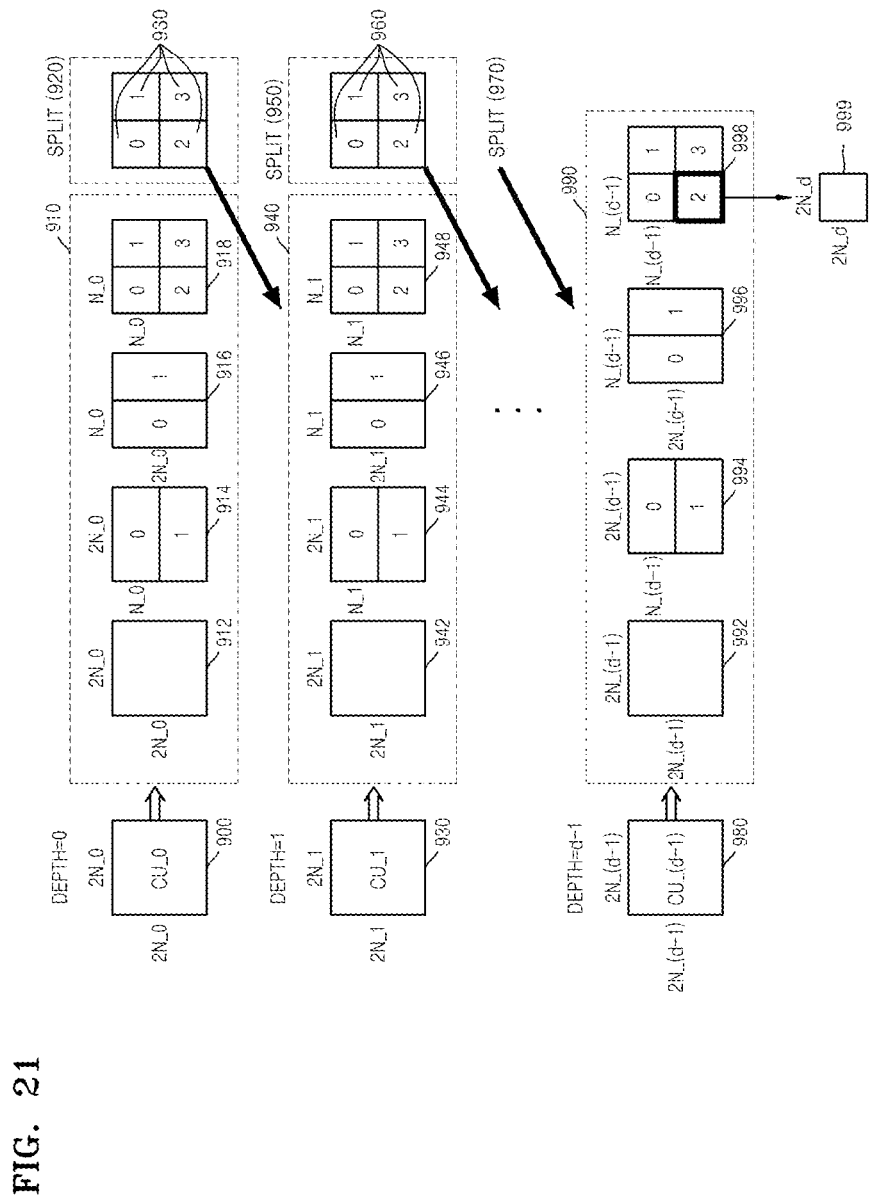
FIG. 21 is a diagram of deeper coding units according to depths, according to an exemplary embodiment.

The receiver and extractor 220 of the video decoding apparatus 200 may extract and use the information 800, 810, and 820 for decoding, according to each deeper coding unit FIG. 21 is a diagram of deeper coding units according to depths, according to an exemplary embodiment.

Split information may be used to indicate a change of a depth. The spilt information represents whether a coding unit of a current depth is split into coding units of a lower depth.

A prediction unit 910 for prediction encoding a coding unit 900 having a depth of 0 and a size of 2N_0×2N_0 may include partitions of a partition type 912 having a size of 2N_0×2N_0, a partition type 914 having a size of 2N_0×N_0, a partition type 916 having a size of N_0×2N_0, and a partition type 918 having a size of N_0×N_0. FIG. 9 only illustrates the partition types 912 through 918 which are obtained by symmetrically splitting the prediction unit 910, but a partition type is not limited thereto, and the partitions of the prediction unit 910 may include asymmetric partitions, partitions having a predetermined shape, and partitions having a geometrical shape.

Prediction encoding is repeatedly performed on one partition having a size of 2N_0×2N_0, two partitions having a size of 2N_0×N_0, two partitions having a size of N_0×2N_0, and four partitions having a size of N_0×N_0, according to each partition type. The prediction encoding in an intra mode and an inter mode may be performed on the partitions having the sizes of 2N_0×2N_0, N_0×2N_0, 2N_0×N_0, and N_0×N_0. The prediction encoding in a skip mode is performed only on the partition having the size of 2N_0×2N_0.

Errors of encoding including the prediction encoding in the partition types 912 through 918 are compared, and the least encoding error is determined among the partition types. If an encoding error is smallest in one of the partition types 912 through 916, the prediction unit 910 may not be split into a lower depth.

If the encoding error is the smallest in the partition type 918, a depth is changed from 0 to 1 to split the partition type 918 in operation 920, and encoding is repeatedly performed on coding units 930 having a depth of 2 and a size of N_0×N_0 to search for a minimum encoding error.

A prediction unit 940 for prediction encoding the coding unit 930 having a depth of 1 and a size of 2N_1×2N_1 (=N_0×N_0) may include partitions of a partition type 942 having a size of 2N_1×2N_1, a partition type 944 having a size of 2N_1×N_1, a partition type 946 having a size of N_1×2N_1, and a partition type 948 having a size of N_1×N_1.

If an encoding error is the smallest in the partition type 948, a depth is changed from 1 to 2 to split the partition type 948 in operation 950, and encoding is repeatedly performed on coding units 960, which have a depth of 2 and a size of N_2×N_2 to search for a minimum encoding error.

When a maximum depth is d, deeper coding units according to depths may be assigned up to when a depth becomes d−1, and split information may be encoded as up to when a depth is one of 0 to d−2. In other words, when encoding is performed up to when the depth is d−1 after a coding unit corresponding to a depth of d−2 is split in operation 970, a prediction unit 990 for prediction encoding a coding unit 980 having a depth of d−1 and a size of 2N_(d−1)×2N_(d−1) may include partitions of a partition type 992 having a size of 2N_(d−1)×2N_(d−1), a partition type 994 having a size of 2N_(d−1)×N_(d−1), a partition type 996 having a size of N_(d−1)×2N_(d−1), and a partition type 998 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), four partitions having a size of N_(d−1)×N_(d−1) from among the partition types 992 through 998 so as to search for a partition type having a minimum encoding error.

Even when the partition type 998 has the minimum encoding error, since a maximum depth is d, a coding unit CU_(d−1) having a depth of d−1 is no longer split to a lower depth, and a coded depth for the coding units constituting a current maximum coding unit 900 is determined to be d−1 and a partition type of the current maximum coding unit 900 may be determined to be N_(d−1)×N_(d−1). Also, since the maximum depth is d and a minimum coding unit 980 having a lowermost depth of d−1 is no longer split to a lower depth, split information for the minimum coding unit 980 is not set.

A data unit 999 may be a 'minimum unit' for the current maximum coding unit. A minimum unit according to an exemplary embodiment may be a rectangular data unit obtained by splitting a minimum coding unit 980 by 4. By performing the encoding repeatedly, the video encoding apparatus 100 may select a depth having the least encoding error by comparing encoding errors according to depths of the coding unit 900 to determine a coded depth, and set a corresponding partition type and a prediction mode as a coding mode of the coded depth.

As such, the minimum encoding errors according to depths are compared in all of the depths of 1 through d, and a depth having the least encoding error may be determined as a coded depth. The coded depth, the partition type of the prediction unit, and the prediction mode may be encoded and transmitted as information about a coding mode. Also, since a coding unit is split from a depth of 0 to a coded depth, only split information of the coded depth is set to 0, and split information of depths excluding the coded depth is set to 1.

The receiver and extractor 220 of the video decoding apparatus 200 may extract and use the information about the coded depth and the prediction unit of the coding unit 900 to decode the partition 912. The video decoding apparatus 200 may determine a depth, in which split information is 0, as a coded depth by using split information according to depths, and use information about a coding mode of the corresponding depth for decoding.

Figure 22:
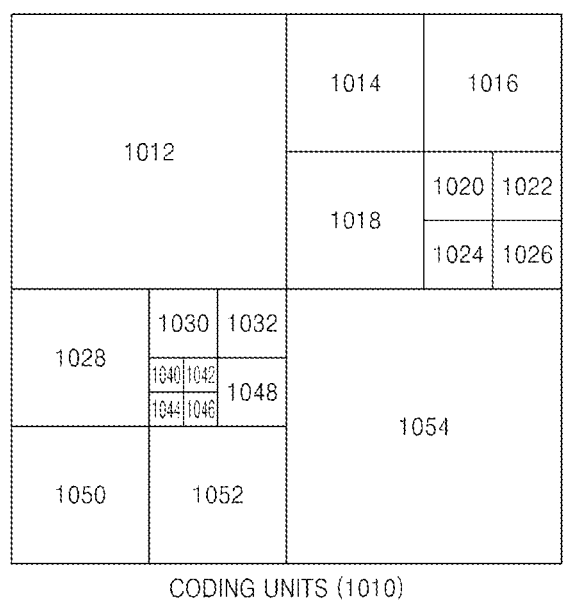
FIGS. 22 through 24 are diagrams for describing a relationship between coding units, prediction units, and transformation units, according to an exemplary embodiment.
Figure 23:
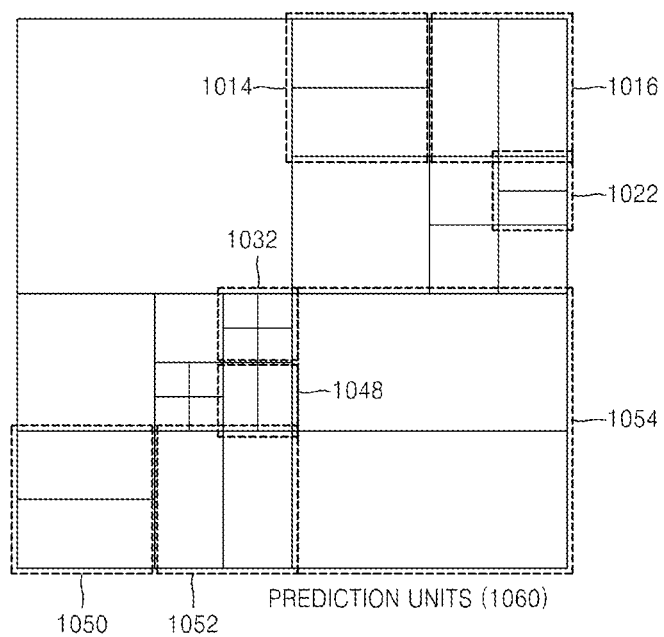
Figure 24:
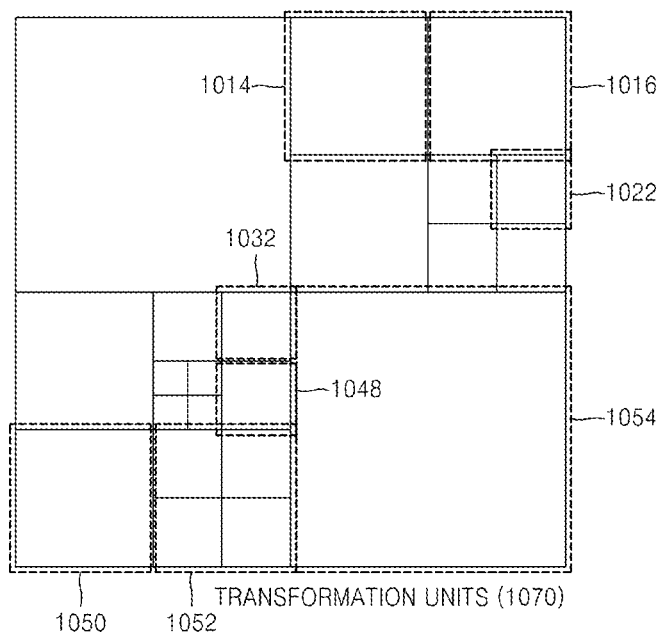

FIGS. 22 through 24 are diagrams for describing a relationship between coding units 1010, prediction units 1060, and transformation units 1070, according to an exemplary embodiment.

The coding units 1010 are coding units having a tree structure, corresponding to coded depths determined by the video encoding apparatus 100, in a maximum coding unit. The prediction units 1060 are partitions of prediction units of each of the coding units 1010, and the transformation units 1070 are transformation units of each of the coding units 1010.

When a depth of a maximum coding unit is 0 in the coding units 1010, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

In the prediction units 1060, some coding units 1014, 1016, 1022, 1032, 1048, 1050, 1052, and 1054 are obtained by splitting the coding units in the coding units 1010. In other words, partition types in the coding units 1014, 1022, 1050, and 1054 have a size of 2N×N, partition types in the coding units 1016, 1048, and 1052 have a size of N×2N, and a partition type of the coding unit 1032 has a size of N×N. Prediction units and partitions of the coding units 1010 are smaller than or equal to each coding unit.

Transformation or inverse transformation is performed on image data of the coding unit 1052 in the transformation units 1070 in a data unit that is smaller than the coding unit 1052. Also, the coding units 1014, 1016, 1022, 1032, 1048, 1050, and 1052 in the transformation units 1070 are different from those in the prediction units 1060 in terms of sizes and shapes. In other words, the video encoding and decoding apparatuses 100 and 200 may perform intra prediction, motion estimation, motion compensation, transformation, and inverse transformation individually on a data unit in the same coding unit.

Accordingly, encoding is recursively performed on each of coding units having a hierarchical structure in each region of a maximum coding unit to determine an optimum coding unit, and thus coding units having a recursive tree structure may be obtained. Encoding information may include split information about a coding unit, information about a partition type, information about a prediction mode, and information about a size of a transformation unit. Table 1 shows the encoding information that may be set by the video encoding and decoding apparatuses 100 and 200.

The information about the partition type may indicate symmetric partition types having sizes of 2N×2N, 2N×N, N×2N, and N×N, which are obtained by symmetrically splitting a height or a width of a prediction unit, and asymmetric partition types having sizes of 2N×nU, 2N×nD, nL×2N, and nR×2N, which are obtained by asymmetrically splitting the height or width of the prediction unit. The asymmetric partition types having the sizes of 2N×nU and 2N×nD may be respectively obtained by splitting the height of the prediction unit in 1:3 and 3:1, and the asymmetric partition types having the sizes of nL×2N and nR×2N may be respectively obtained by splitting the width of the prediction unit in 1:3 and 3:1

The size of the transformation unit may be set to be two types in the intra mode and two types in the inter mode. In other words, if split information of the transformation unit is 0, the size of the transformation unit may be 2N×2N, which is the size of the current coding unit. If split information of the transformation unit is 1, the transformation units may be obtained by splitting the current coding unit. Also, if a partition type of the current coding unit having the size of 2N×2N is a symmetric partition type, a size of a transformation unit may be N×N, and if the partition type of the current coding unit is an asymmetric partition type, the size of the transformation unit may be N/2×N/2.

The encoding information about coding units having a tree structure may include at least one of a coding unit corresponding to a coded depth, a prediction unit, and a minimum unit. The coding unit corresponding to the coded depth may

TABLE 1

Split Information 0
(Encoding on Coding Unit having Size of 2N × 2N and Current Depth of d)

| Prediction Mode | Partition Type | | Size of Transformation Unit | | Split Information 1 |
| --- | --- | --- | --- | --- | --- |
| | Symmetric Partition Type | Asymmetric Partition Type | Split Information 0 of Transformation Unit | Split Information 1 of Transformation Unit | |
| Intra Inter Skip (Only 2N × 2N) | 2N × 2N 2N × N N × 2N N × N | 2N × nU 2N × nD nL × 2N nR × 2N | 2N × 2N | N × N (Symmetric Partition Type) N/2 × N/2 (Asymmetric Partition Type) | Repeatedly Encode Coding Units having Lower Depth of d + 1 |

The output unit 130 of the video encoding apparatus 100 may output the encoding information about the coding units having a tree structure, and the receiver and extractor 220 of the video decoding apparatus 200 may extract the encoding information about the coding units having a tree structure from a received bitstream.

Split information represents whether a current coding unit is split into coding units of a lower depth. If split information of a current depth d is 0, a depth, in which a current coding unit is no longer split into a lower depth, is a coded depth, and thus information about a partition type, prediction mode, and a size of a transformation unit may be defined for the coded depth. If the current coding unit is further split according to the split information, encoding is independently performed on four split coding units of a lower depth.

A prediction mode may be one of an intra mode, an inter mode, and a skip mode. The intra mode and the inter mode may be defined in all partition types, and the skip mode is defined only in a partition type having a size of 2N×2N.

include at least one of a prediction unit and a minimum unit containing the same encoding information.

Accordingly, it is determined whether adjacent data units are included in the same coding unit corresponding to the coded depth by comparing encoding information of the adjacent data units. Also, a corresponding coding unit corresponding to a coded depth is determined by using encoding information of a data unit, and thus a distribution of coded depths in a maximum coding unit may be determined.

Accordingly, if a current coding unit is predicted based on encoding information of adjacent data units, encoding information of data units in deeper coding units adjacent to the current coding unit may be directly referred to and used.

Alternatively, if a current coding unit is predicted based on encoding information of adjacent data units, data units adjacent to the current coding unit are searched using encoded information of the data units, and the searched adjacent coding units may be referred to for predicting the current coding unit.

Figure 25:
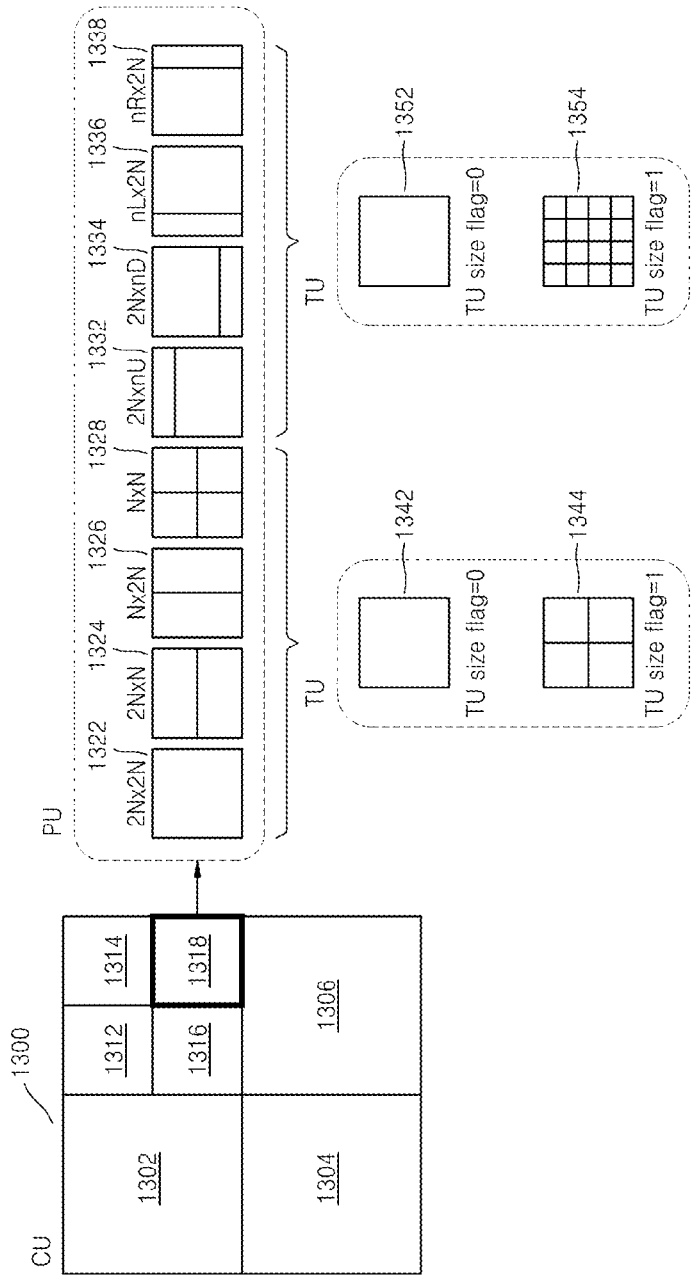
FIG. 25 is a diagram for describing a relationship between a coding unit, a prediction unit or a partition, and a transformation unit, according to coding mode information of Table 1.

FIG. 25 is a diagram for describing a relationship between a coding unit, a prediction unit or a partition, and a transformation unit, according to coding mode information of Table 1.

A maximum coding unit 1300 includes coding units 1302, 1304, 1306, 1312, 1314, 1316, and 1318 of coded depths. Here, since the coding unit 1318 is a coding unit of a coded depth, split information may be set to 0. Information about a partition type of the coding unit 1318 having a size of 2N×2N may be set to be one of a partition type 1322 having a size of 2N×2N, a partition type 1324 having a size of 2N×N, a partition type 1326 having a size of N×2N, a partition type 1328 having a size of N×N, a partition type 1332 having a size of 2N×nU, a partition type 1334 having a size of 2N×nD, a partition type 1336 having a size of nL×2N, and a partition type 1338 having a size of nR×2N.

Split information (TU size flag) of a transformation unit is a sort of a transformation index, and the size of a transformation unit corresponding to the transformation index may vary according to a prediction unit type or a partition type of a coding unit.

For example, when the partition type is set to be symmetric, i.e., the partition type 1322, 1324, 1326, or 1328, a transformation unit 1342 having a size of 2N×2N is set if a TU size flag is 0, and a transformation unit 1344 having a size of N×N is set if a TU size flag is 1.

When the partition type is set to be asymmetric, i.e., the partition type 1332, 1334, 1336, or 1338, a transformation unit 1352 having a size of 2N×2N is set if a TU size flag is 0, and a transformation unit 1354 having a size of N/2×N/2 is set if a TU size flag is 1.

Referring to FIG. 21, the TU size flag is a flag having a value or 0 or 1, but the TU size flag is not limited to 1 bit, and a transformation unit may be hierarchically split having a tree structure while the TU size flag increases from 0. The TU size flag may be used as an example of a transformation index.

In this case, the size of a transformation unit that has been actually used may be expressed by using a TU size flag of a transformation unit, according to an exemplary embodiment, together with a maximum size and minimum size of the transformation unit. According to an exemplary embodiment, the video encoding apparatus 100 is capable of encoding maximum transformation unit size information, minimum transformation unit size information, and a maximum TU size flag. The encoding result of the maximum transformation unit size information, the minimum transformation unit size information, and the maximum TU size flag may be inserted into an SPS. According to an exemplary embodiment, the video decoding apparatus 200 may decode video by using the maximum transformation unit size information, the minimum transformation unit size information, and the maximum TU size flag.

For example, (a) if the size of a current coding unit is 64×64 and a maximum transformation unit size is 32×32, then (a-1) the size of a transformation unit may be 32×32 when a TU size flag is 0, (a-2) may be 16×16 when the TU size flag is 1, and (a-3) may be 8×8 when the TU size flag is 2.

As another example, (b) if the size of the current coding unit is 32×32 and a minimum transformation unit size is 32×32, then (b-1) the size of the transformation unit may be 32×32 when the TU size flag is 0. Here, the TU size flag cannot be set to a value other than 0, since the size of the transformation unit cannot be less than 32×32.

As another example, (c) if the size of the current coding unit is 64×64 and a maximum TU size flag is 1, then the TU size flag may be 0 or 1. Here, the TU size flag cannot be set to a value other than 0 or 1.

Thus, if it is defined that the maximum TU size flag is 'MaxTransformSizeIndex', a minimum transformation unit size is 'MinTransformSize', and a root transformation unit size is 'RootTuSize' when the TU size flag is 0, then a current minimum transformation unit size 'CurrMinTuSize' that can be determined in a current coding unit, may be defined by Equation (20):

$$CurrMinTuSize = \max(MinTransformSize, RootTuSize/(2^{MaxTransformSizeIndex})) \quad (20)$$

Compared to the current minimum transformation unit size 'CurrMinTuSize' that can be determined in the current coding unit, the root transformation unit size 'RootTuSize' may denote a maximum transformation unit size that may be selected in the system. In Equation (20), 'RootTuSize/(2^MaxTransformSizeIndex)' denotes a transformation unit size when the root transformation unit size 'RootTuSize' is split a number of times corresponding to the maximum TU size flag, and 'MinTransformSize' denotes a minimum transformation size. Thus, a smaller value from among 'RootTuSize/(2^MaxTransformSizeIndex)' and 'MinTransformSize' may be the current minimum transformation unit size 'CurrMinTuSize' that may be determined in the current coding unit.

According to an exemplary embodiment, the root transformation unit size 'RootTuSize' may vary according to the type of a prediction mode.

For example, if a current prediction mode is an inter mode, then 'RootTuSize' may be determined by using Equation (21) below. In Equation (21), 'MaxTransformSize' denotes a maximum transformation unit size, and 'PUSize' denotes a current prediction unit size.

$$RootTuSize = \min(MaxTransformSize, PUSize) \quad (21)$$

That is, if the current prediction mode is the inter mode, the root transformation unit size 'RootTuSize' when the TU size flag is 0 may be a smaller value from among the maximum transformation unit size and the current prediction unit size.

If a prediction mode of a current partition unit is an intra mode, 'RootTuSize' may be determined by using Equation (22) below. In Equation (22), 'PartitionSize' denotes the size of the current partition unit.

$$RootTuSize = \min(MaxTransformSize, PartitionSize) \quad (22)$$

That is, if the current prediction mode is the intra mode, the root transformation unit size 'RootTuSize' may be a smaller value from among the maximum transformation unit size and the size of the current partition unit.

However, the current maximum transformation unit size that varies according to the type of a prediction mode in a partition unit, the root transformation unit size 'RootTuSize', is just an example and one or more other exemplary embodiments are not limited thereto.

Figure 26:
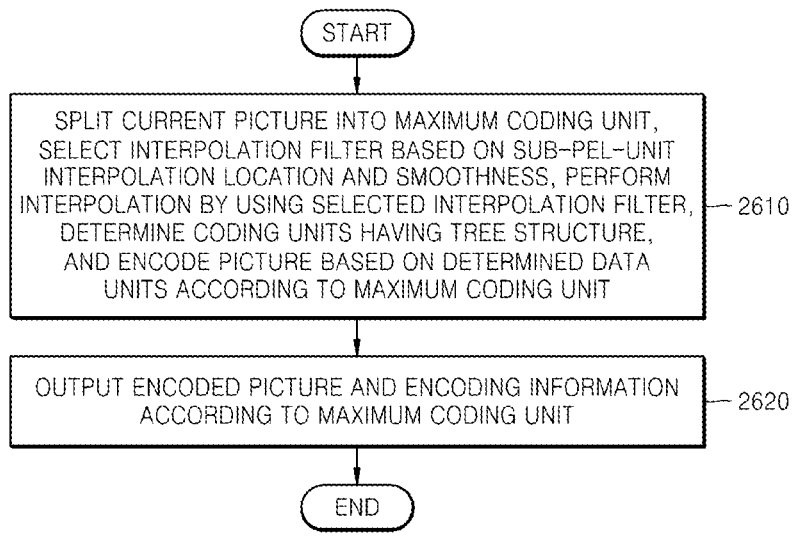
FIG. 26 is a flowchart of a video encoding method using a smoothing interpolation filter based on coding units having a tree structure, according to an exemplary embodiment.

FIG. 26 is a flowchart of a video encoding method using a smoothing interpolation filter based on coding units having a tree structure, according to an exemplary embodiment.

In operation 2610, in order to encode a current picture of an input video, the current picture is split into at least one maximum coding unit. Each of at least one split region, which is obtained by splitting a region of each maximum coding unit according to depths, may be encoded. In order to encode each split region according to depths, transformation and quantization are performed on an inter prediction result based on sub-pel-unit interpolation, and intra prediction.

Here, a split depth for outputting a final encoding result according to the at least one split region may be determined by comparing results of encoding split regions according to depths, and coding units included in a current maximum coding unit and having a tree structure may be determined. Like the coding units having a tree structure, transformation units having a tree structure may be determined. In other words, as an encoding result of a picture, like the determined coding units having a tree structure, an encoding result of the transformation units having a tree structure may be output as encoded data of the picture.

Inter prediction may be performed on each prediction unit or partition of the coding unit. Motion of a current prediction unit or partition may be predicted with reference to pixels generated by performing sub-pel-unit interpolation. From among interpolation filters for generating a sub-pel-unit pixel value, an interpolation filter is differently selected based on a sub-pel-unit interpolation location and a smoothness. In order to efficiently perform image interpolation, interpolation filter coefficients may be selectively determined.

From among interpolation filter coefficients previously stored in memory, a desired interpolation filter may be selected according to a sub-pel-unit interpolation location, a smoothness, the number of filter taps, a bit depth, a scaling factor, a basis function of interpolation filtering based on transformation, and a color component, and interpolation may be performed to generate the sub-pel-unit pixel value.

In operation 2620, image data obtained as the final encoding result according to the at least one split region of each maximum coding unit, and information about the coded depth and the coding mode are output as a bitstream.

The information about the coding mode may include information about the coded depth or split information, information about a partition type of a prediction unit, information about a prediction mode, and information about a tree structure of transformation units. The encoding information may include information about an interpolation filter used to perform sub-pel-unit prediction encoding. The encoded information about the coding mode may be transmitted to a decoding apparatus together with the encoded image data.

Figure 27:
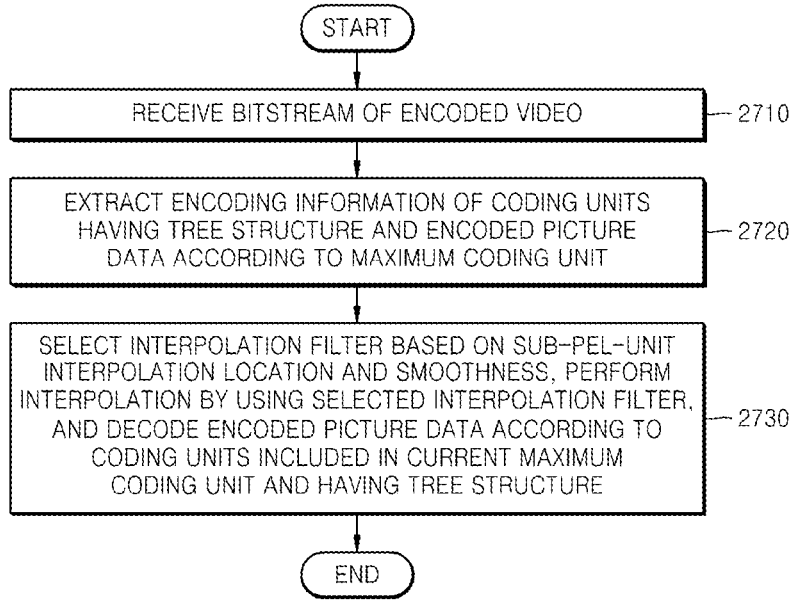
FIG. 27 is a flowchart of a video decoding method using a smoothing interpolation filter based on coding units having a tree structure, according to an exemplary embodiment.

FIG. 27 is a flowchart of a video decoding method using a smoothing interpolation filter based on coding units having a tree structure, according to an exemplary embodiment.

In operation 2710, a bitstream of an encoded video is received and parsed.

In operation 2720, encoded image data of a current picture assigned to a maximum coding unit, and information about a coded depth and a coding mode according to maximum coding units are extracted from the parsed bitstream. Information about an interpolation filter required to perform sub-pel-unit motion compensation may be extracted from the encoding information.

Information about the coded depth and the coding mode may be extracted from the encoding information. According to the information about the coded depth and the coding mode, a maximum coding unit may be split into coding units having a tree structure. Also, according to information about a tree structure of transformation units included in the extracted information, transformation units having a tree structure according to transformation depths in the coding units may be determined.

In operation 2730, by using the information about the coded depth and the coding mode according to each maximum coding unit, image data of each maximum coding unit may be decoded based on the coding units having a tree structure, prediction units, and the transformation units having a tree structure. Since a current coding unit is decoded based on the information about the coded depth and the coding mode, a current coding unit may be inversely transformed by using a transformation unit determined from among the transformation units having a tree structure.

Encoded picture data may be decoded by performing various decoding operations such as motion compensation and intra prediction on each prediction unit or partition of the coding unit based on the coding mode.

Specifically, if encoded residual data and reference data are extracted based on pixels interpolated in a sub-pel unit, motion compensation on a current prediction unit or a current partition may be performed based on the pixels interpolated in sub-pel units. From among interpolation filters for generating a sub-pel-unit pixel value, an interpolation filter may be differently selected based on a sub-pel-unit interpolation location and a smoothness.

In order to efficiently perform image interpolation, interpolation filter coefficients may be selectively determined. From among interpolation filter coefficients previously stored in memory, a desired interpolation filter may be selected according to a sub-pel-unit interpolation location, a smoothness, the number of filter taps, a bit depth, a scaling factor, a basis function of interpolation filtering based on transformation, and a color component, and interpolation may be performed to generate the sub-pel-unit pixel value.

A reference picture and a reference region are determined by using the reference data, and the sub-pel-unit pixel value may be generated by performing interpolation filtering on two or more integer-pel-unit reference pixels of the reference picture. Motion compensation may be performed on the current prediction unit or the current partition by combining the generated sub-pel-unit pixel value and the residual data, and thus prediction decoding may be performed.

Since each maximum coding unit is decoded, image data in a spatial domain may be reconstructed, and a picture and a video that is a picture sequence may be reconstructed. The reconstructed video may be reproduced by a reproduction apparatus, may be stored in a storage medium, or may be transmitted in a network.

Exemplary embodiments may be written as computer programs and may be implemented in general-use digital computers that execute the programs using a computer readable recording medium. Examples of the computer readable recording medium include magnetic storage media (e.g., ROM, floppy disks, hard disks, etc.) and optical recording media (e.g., CD-ROMs, or DVDs). Moreover, it is understood that in exemplary embodiments, one or more units of the above-described apparatuses can include circuitry, a processor, a microprocessor, etc., and may execute a computer program stored in a computer-readable medium.

While exemplary embodiments have been particularly shown and described above, it will be understood by those of ordinary skill in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of exemplary embodiments but by the appended claims, and all differences within the scope will be construed as being included in the present invention.

What is claimed is:

1. A method of motion compensation, the method comprising:

determining, in a luma reference picture, a luma reference block for prediction of a current block, by using a luma motion vector of the current block;

generating a luma sample of a 2/4-pixel location included in the luma reference block by applying an 8-tap filter to luma samples of an integer pixel location of the luma reference picture;

determining, in a chroma reference picture, a chroma reference block for prediction of a current block, by using a chroma motion vector of the current block; and generating at least one chroma sample of at least one of 1/8, 2/8 and 3/8-pixel locations included in the chroma reference block by applying a 4-tap filter to chroma samples of an integer pixel location of the chroma reference picture, wherein the 8-tap filter includes eight filter coefficients, the 4-tap filter includes four filter coefficients for interpolation, and filter coefficients of the 4-tap filter for generating the chroma sample of the 2/8-pixel location are arranged in reverse order against filter coefficients of the 4-tap filter for generating the chroma sample of the 6/8-pixel location.

2. The method of claim 1, wherein the generating of the luma sample comprises: scaling the luma sample generated by applying the 8-tap filter by using a luma scaling factor that a sum of coefficients of the 8-tap filter is 1.

3. The method of claim 1, wherein the generating of the at least one chroma sample comprises: scaling the chroma sample generated by applying the 4-tap filter by using a chroma scaling factor that a sum of coefficients of the 4-tap filter is 1.

* * * * *